(12) United States Patent
Rothbaum

(10) Patent No.: US 8,841,556 B2
(45) Date of Patent: Sep. 23, 2014

(54) MAGNETIC CORD MANAGEMENT SYSTEM

(75) Inventor: Wayne Philip Rothbaum, New York, NY (US)

(73) Assignee: CJD LLC, New York, NY (US)

( * ) Notice: Subject to any disclaimer, the term of this patent is extended or adjusted under 35 U.S.C. 154(b) by 0 days.

(21) Appl. No.: 13/550,527

(22) Filed: Jul. 16, 2012

(65) Prior Publication Data

US 2012/0279756 A1  Nov. 8, 2012

Related U.S. Application Data

(63) Continuation of application No. 12/338,680, filed on Dec. 18, 2008, now abandoned.

(51) Int. Cl.
  *H01B 7/40*    (2006.01)
  *F16G 11/00*   (2006.01)
  *H01F 7/02*    (2006.01)

(52) U.S. Cl.
  CPC .............. *F16G 11/00* (2013.01); *H01F 7/0252* (2013.01)
  USPC .......... 174/111; 174/69; 174/135; 248/206.5; 248/309.4

(58) Field of Classification Search
  CPC ............ H01B 11/06; H01B 7/40; H01B 7/06; C08L 2203/202; H04R 1/1016; H04R 1/1091
  USPC .......... 248/683, 206.5, 207, 309.4; 455/66.1, 455/90.3, 569.1; 381/55, 74, 124; 174/36, 174/111, 69, 135
  See application file for complete search history.

(56) References Cited

U.S. PATENT DOCUMENTS

| | | | |
|---|---|---|---|
| 1,485,994 A | | 3/1924 | Salisbury |
| 1,675,421 A | * | 7/1928 | Pettee et al. .................. 174/107 |
| 2,160,961 A | | 6/1939 | Dorman |
| 2,386,000 A | * | 10/1945 | McQuiston .................. 439/447 |
| 2,522,072 A | * | 9/1950 | Tierney, Jr. .................. 174/372 |
| 2,585,054 A | | 2/1952 | Stachura |
| 2,795,641 A | | 6/1957 | Rowell |
| 2,946,839 A | | 7/1960 | Horning |
| 2,965,939 A | | 12/1960 | Olsson |
| 3,038,558 A | | 6/1962 | Plummer |
| 3,041,697 A | | 7/1962 | Budreck |

(Continued)

FOREIGN PATENT DOCUMENTS

| | | |
|---|---|---|
| AU | 2005100726 | 10/2005 |
| CN | 201352845 Y | 11/2009 |

(Continued)

OTHER PUBLICATIONS

KIPRIS, translation of KR200301311, Jan. 1, 2003, pp. 1-16.*

(Continued)

*Primary Examiner* — Kimberly Wood
(74) *Attorney, Agent, or Firm* — Morgan, Lewis & Bockius LLP

(57) ABSTRACT

A cord management apparatus comprises one or more magnets, configurable to be coupled to an electronic cord. The apparatus comprises one or more sheaths configured to be coupled to at least a portion of the electronic cord, wherein the one or more sheaths are configured to be magnetically attached to the magnet. A cord management device comprising one or more pliable sheaths is described also.

19 Claims, 15 Drawing Sheets

(56) References Cited

U.S. PATENT DOCUMENTS

| | | | |
|---|---|---|---|
| 3,068,316 A | 12/1962 | Witt | |
| 3,209,061 A * | 9/1965 | Mier et al. | 174/5 R |
| 3,373,954 A | 3/1968 | Hilsinger, Jr. | |
| 3,387,341 A | 6/1968 | Mates et al. | |
| 3,668,321 A | 6/1972 | Lang | |
| 4,052,911 A | 10/1977 | Feldstein | |
| 4,586,675 A | 5/1986 | Brown | |
| 4,770,332 A | 9/1988 | Pomerantz | |
| 4,920,235 A * | 4/1990 | Yamaguchi | 174/36 |
| 4,939,778 A | 7/1990 | Tomberlin | |
| 4,991,788 A | 2/1991 | Pattison | |
| 5,014,946 A | 5/1991 | Gruber | |
| 5,027,864 A | 7/1991 | Conti et al. | |
| 5,048,158 A | 9/1991 | Koerner | |
| 5,130,899 A | 7/1992 | Larkin et al. | |
| 5,142,743 A | 9/1992 | Hahn | |
| 5,388,155 A | 2/1995 | Smith | |
| 5,397,243 A | 3/1995 | MacMurdo, Sr. | |
| 5,518,214 A | 5/1996 | Spencer | |
| 5,535,787 A | 7/1996 | Howell | |
| 5,571,160 A | 11/1996 | Nyman | |
| 5,572,773 A | 11/1996 | Bauer | |
| 5,573,422 A | 11/1996 | Lawliss | |
| 5,584,452 A | 12/1996 | Koike | |
| 5,586,760 A | 12/1996 | Hauter | |
| 5,600,098 A | 2/1997 | Kazaks | |
| 5,615,585 A | 4/1997 | Chi | |
| 5,619,569 A | 4/1997 | McVay | |
| 5,682,653 A | 11/1997 | Berglof et al. | |
| 5,710,812 A | 1/1998 | Fogel | |
| D390,447 S | 2/1998 | Colen, Jr. | |
| 5,722,126 A | 3/1998 | Reiter | |
| 5,802,676 A | 9/1998 | Tolan | |
| 5,832,098 A | 11/1998 | Chen | |
| 5,895,018 A | 4/1999 | Rielo | |
| 5,927,235 A | 7/1999 | Olaiz | |
| 5,933,926 A | 8/1999 | Reiter | |
| 5,983,464 A | 11/1999 | Bauer | |
| 6,050,587 A | 4/2000 | Panhausen | |
| 6,076,790 A | 6/2000 | Richter | |
| 6,087,594 A | 7/2000 | Chou | |
| 6,233,345 B1 | 5/2001 | Urwyler | |
| 6,265,039 B1 | 7/2001 | Drinkwater et al. | |
| 6,293,509 B1 | 9/2001 | Richter | |
| 6,302,347 B1 | 10/2001 | Amirault | |
| 6,344,021 B1 | 2/2002 | Juster et al. | |
| 6,379,178 B1 | 4/2002 | Jones, III et al. | |
| 6,386,238 B1 | 5/2002 | Hestetune | |
| 6,405,983 B1 | 6/2002 | Goj | |
| 6,427,290 B1 | 8/2002 | Liu | |
| 6,467,132 B1 | 10/2002 | Robley | |
| 6,543,094 B2 | 4/2003 | D'Addario | |
| 6,685,502 B2 | 2/2004 | Wheeler | |
| 6,690,808 B2 | 2/2004 | Urwyler | |
| 6,698,560 B2 | 3/2004 | Reardon et al. | |
| 6,833,507 B2 | 12/2004 | Arkin et al. | |
| 6,880,270 B2 | 4/2005 | Prather | |
| 6,992,253 B1 * | 1/2006 | Spellman et al. | 174/74 R |
| 7,025,509 B2 * | 4/2006 | Martin | 385/86 |
| 7,078,615 B2 | 7/2006 | Gladfelter et al. | |
| 7,202,414 B2 * | 4/2007 | Johnson | 174/36 |
| 7,204,734 B2 | 4/2007 | Kawasaki | |
| 7,213,278 B2 | 5/2007 | Peterson et al. | |
| 7,222,796 B2 | 5/2007 | Taras | |
| D572,156 S | 7/2008 | Payne | |
| 7,402,045 B2 | 7/2008 | Schwartzbart et al. | |
| 7,436,974 B2 * | 10/2008 | Harper | 381/374 |
| D581,255 S | 11/2008 | Calvin | |
| 7,622,670 B1 | 11/2009 | Sanderson et al. | |
| 7,644,895 B2 | 1/2010 | Tseng | |
| 7,648,027 B2 | 1/2010 | Lin et al. | |
| 7,699,198 B2 | 4/2010 | Sirichai et al. | |
| 7,712,696 B2 | 5/2010 | Loh | |
| 7,781,674 B2 | 8/2010 | Kassab | |
| D624,378 S | 9/2010 | Wysopal | |
| D636,659 S | 4/2011 | Rothbaum et al. | |
| 7,982,131 B2 | 7/2011 | Fagrenius et al. | |
| 8,002,159 B2 | 8/2011 | Cragg | |
| D645,333 S | 9/2011 | Rothbaum et al. | |
| 8,103,352 B2 | 1/2012 | Fried et al. | |
| D654,052 S | 2/2012 | Lee et al. | |
| D660,740 S | 5/2012 | Cullen et al. | |
| 8,261,416 B2 | 9/2012 | Rothbaum et al. | |
| 2001/0010727 A1 | 8/2001 | Urwyler | |
| 2001/0035242 A1 | 11/2001 | Hughs et al. | |
| 2002/0033271 A1 * | 3/2002 | Fritschle et al. | 174/117 F |
| 2002/0065115 A1 * | 5/2002 | Lindholm | 455/568 |
| 2002/0073516 A1 | 6/2002 | Behar | |
| 2002/0112323 A1 | 8/2002 | Nire | |
| 2003/0229974 A1 | 12/2003 | Zemer et al. | |
| 2004/0003487 A1 | 1/2004 | Reiter | |
| 2005/0016760 A1 | 1/2005 | Vasichek | |
| 2005/0025329 A1 | 2/2005 | Lee | |
| 2005/0072872 A1 | 4/2005 | Shack et al. | |
| 2005/0220319 A1 | 10/2005 | Chan et al. | |
| 2005/0255898 A1 | 11/2005 | Huang | |
| 2006/0008106 A1 | 1/2006 | Harper | |
| 2006/0121962 A1 | 6/2006 | Kohli | |
| 2006/0178041 A1 | 8/2006 | Lund et al. | |
| 2006/0185873 A1 | 8/2006 | Johnson | |
| 2006/0186150 A1 | 8/2006 | Willows et al. | |
| 2006/0262578 A1 | 11/2006 | Farrar et al. | |
| 2007/0023559 A1 | 2/2007 | Scapillato et al. | |
| 2007/0086617 A1 | 4/2007 | Loh | |
| 2007/0096913 A1 | 5/2007 | Marin Palacios et al. | |
| 2007/0099681 A1 | 5/2007 | Kielland | |
| 2007/0151750 A1 * | 7/2007 | Dean | 174/136 |
| 2007/0152008 A1 | 7/2007 | Case | |
| 2007/0165371 A1 | 7/2007 | Brandenburg | |
| 2007/0187544 A1 | 8/2007 | Proebstle | |
| 2007/0279072 A1 * | 12/2007 | Fagrenius et al. | 324/539 |
| 2007/0287302 A1 | 12/2007 | Lindberg et al. | |
| 2008/0023508 A1 | 1/2008 | Harchol | |
| 2008/0121407 A1 | 5/2008 | Kassab | |
| 2008/0134474 A1 | 6/2008 | Uryasov | |
| 2008/0149679 A1 | 6/2008 | Case et al. | |
| 2008/0164157 A1 | 7/2008 | Sween et al. | |
| 2008/0222861 A1 | 9/2008 | Son | |
| 2008/0271299 A1 | 11/2008 | Kilbarger | |
| 2008/0289151 A1 | 11/2008 | Chan | |
| 2009/0013504 A1 | 1/2009 | Crespo | |
| 2009/0016559 A1 | 1/2009 | Cleary | |
| 2009/0094799 A1 | 4/2009 | Ashel | |
| 2009/0314515 A1 | 12/2009 | Bevirt et al. | |
| 2010/0150370 A1 | 6/2010 | Bales et al. | |

FOREIGN PATENT DOCUMENTS

| | | | |
|---|---|---|---|
| EP | 1182848 A1 | 2/2002 | |
| FR | 2865860 | 8/2005 | |
| GB | 869275 | 5/1961 | |
| JP | 63-125493 U | 8/1988 | |
| JP | 8195120 A | 7/1996 | |
| JP | 11-317995 A | 11/1999 | |
| JP | 2001-169381 A | 6/2001 | |
| JP | 2002-025356 A | 1/2002 | |
| JP | 2003-230418 A | 8/2003 | |
| JP | 2003-319484 A | 11/2003 | |
| JP | 2003-324784 A | 11/2003 | |
| JP | 2006-081130 A | 3/2006 | |
| JP | 2006-222712 A | 8/2006 | |
| JP | 2009-212918 A | 9/2009 | |
| KR | 10-0470798 | 8/1999 | |
| KR | 2002-0040678 | 5/2002 | |
| KR | 20-2002-0027357 | 1/2003 | |
| KR | 200301311 | * 1/2003 | |
| WO | WO 2004-71056 A1 | 8/2004 | |
| WO | WO 2007/138392 A1 | 12/2007 | |

OTHER PUBLICATIONS

Rothbaum, Office Action, U.S. Appl. No. 12/338,680, Sep. 9, 2011, 11 pgs.

(56) References Cited

OTHER PUBLICATIONS

Rothbaum, Office Action, U.S. Appl. No. 12/338,680, Mar. 14, 2012, 8 pgs.
Rothbaum, Office Action, U.S. Appl. No. 13/009,791, Oct. 12, 2011, 15 pgs.
Rothbaum, Office Action, U.S. Appl. No. 13/009,791, Mar. 21, 2012, 11 pgs.
Black Beaded Hemalite Magnetic Necklace, www.amazon.com, printed Nov. 2008, 1 pg.
BlueLounge cableyoyo Ultra-Thin Cord Manager, www.ilounge.com/index.php/reviews/entry/bluelounge-cableyoy . . . , printed Jun. 7, 2010, 4 pgs.
CJD LLC, International Search Report/Written Opinion, PCT/US2010/031087, Apr. 29, 2011, 24 pgs.
Earbud Clips, www.wetjetset.com/store/item/42, printed Jun. 7, 2010, 3 pgs.
Evolution Review from Treo Central, SCOTTeVEST, Jun. 25, 2008, 1 pg.
Headphone Cable Tidy—Pack of 3—Accessories for PDA, Smartphone . . . , www.proporta.com/F02/PPF02P05.php?t_id=4452&t_mode=des . . . printed Jun. 7, 2010, 2 pgs.
Hook Industries Budfrog, www.ilounge.com/index.php/reviews/entry/hook-industries-budf . . . , printed Jun. 7, 2010, 4 pgs.
Magneat Universal Magnetic Headphone Cord and Wire Manager, www.koyono.com/ProductDetails.asp?ProductCode=EAN13& . . . , printed Jun. 7, 2010, 4 pgs.
Magneat, www.askmen.com/entertainment/gadget/magneat.html, printed Jun. 7, 2010, 2 pgs.
Magnetic Lanyard Pen, 2008, 1 pg.
Marware Sidewinder for iPhone 1G, www.techng.com/Marware-Sidewinder-for-iPhone-1G/M/B00 . . . , printed Jun. 7, 2010, 2 pgs.
Power Support Cord Gatherer, www.ilounge.com/index.php/reviews/entry/power-support-cord . . . , printed Jun. 7, 2010, 3 pgs.
Quogue Capital LLC, International Search Report/Written Opinion, PCT/US2009/067927, Jul. 14, 2010, 8 pgs.
Rothbaum, International Search Report/Written Opinion, PCT/US2010/053244, Jun. 24, 2011, 24 pgs.
SeV Magnetism, SCOTTeVEST, printed Nov. 2002, 1 pg.
Smart iPod Management, www.livevideo.com/video/7B9D626D1FDE433184C32A8B5 . . . , printed Jun. 7, 2010, 2 pgs.
Sumajin SmartWrap Earphone Cord Manager, www.ilounge.com/index.php/reviews/entry/sumajin-smartwrap . . . , printed Jun. 7, 2010, 3 pgs.
Tunewear TuneClip Cable Winder for Earphones and Headphones, www.ilounge.com/index.php/reviews/entry/tunewear-tuneclip-c . . . , printed Jun. 7, 2010, 3 pgs.
Use Magnetic Paper Clips to Keep Cords from Tangling, www.geeksugar.com/Use-Magnetic-Paper-Clips-Keep-Cords-From-Tangling, printed Jun. 7, 2010, 5 pgs.
Wheezie's Shop Announcement, wheezies.etsy.com, printed Jul. 3, 2008, 3 pgs.

\* cited by examiner

Cylindrical, spherical, or other shaped pieces that click, snap or pin together

MAGNETIC CORD MANAGEMENT SYSTEM

RELATED APPLICATION

This application is a continuation of U.S. application Ser. No. 12/338,680, filed Dec. 18, 2008 now abandoned. The foregoing application is incorporated by reference in this application in its entirety.

TECHNICAL FIELD

The disclosed embodiments relate generally to a system for managing cords used in electronic products, and in particular to a magnetic system for managing cords associated with earphones, headsets, data cords, and power cords.

BACKGROUND

Electronic devices, such as cellular telephones, media players, MP3 players, etc. generally have a connector for an earphone or headset. The earphone or headset typically includes a length of wire having a plug on one end (to connect to the electronic device) and one or more earphones, microphones, audio controls, or ear buds on the other end. The length of wire is typically between one to two meters long, and is typically lightweight and prone to becoming entangled in itself or with other items. This can pose a problem for a user during use, for example when the user is sitting, the wire can tangle or loop together causing the ear buds to be pulled from the user's ear upon standing up. This problem may also occur when running, exercising, etc. This can also cause a problem during storage (e.g., when the user puts the media player in his or her pocket/purse) as the wire can become entangled, and form a knot upon being retrieved or pulled. This is frustrating for the user and may damage the cord.

In addition, it is desirable to have a convenient system for managing or storing a cord or cords associated with an electronic device. In some embodiments, it is desirable to store cords together, i.e., to attach cords together in a neat bundle. In some embodiments, it is desirable to attach cords to electronic devices with which they are associated, e.g., to prevent the cord and device from separating, etc.

It would be desirable to have a device that prevents cords, such as multimedia, earphone, microphone, or headset cords, from tangling during use or storage.

SUMMARY

A cord management apparatus comprises one or more magnets and/or ferrous metals configurable to be coupled to an electronic cord, and one or more sheaths configured to be coupled to at least a portion of the electronic cord. The one or more sheaths are configured to be magnetically attached to the magnet, or to be magnetic. A plurality of sheaths may be magnetically coupled to a magnet and a plurality of magnets may be magnetically coupled to a sheath. In some embodiments, a sheath or plurality of sheaths may comprise a chain.

In some embodiments, the one or more sheaths and the one or more magnets are symmetric around the electronic cord. In some embodiments, the one or more sheaths and the one or more magnets substantially enclose a cross-section of the cord. In some embodiments, the one or more sheaths and the one or more magnets present a non-hooking surface around the electronic cord.

In some embodiments, the one or more sheaths comprise a magnetic material. In some embodiments, at least one of the one or more sheaths comprises a magnet. In some embodiments, a first respective magnet of the one or more magnets is configured to be coupled to the cord proximate to a connector attached to the cord. In some embodiments, a second respective magnet of the one or more magnets is configured to be coupled to the cord away from the connector attached to the cord.

In some embodiments, the magnet is configured to clip around the cord. In some embodiments, the one or more magnets are configured to be compressed around the cord. In some embodiments, one or more magnets each comprise a plurality of distinct parts. In some embodiments, the one or more magnets are configured to be wrapped around the cord. In some embodiments, the one or more magnets are configured to be threaded around the cord. In some embodiments, the one or more magnets are configured to be coupled to the cord using an adhesive. In some embodiments, the one or more sheaths are configured to magnetically attach the cord to the magnet in response to a user squeezing at least one of the sheaths and the magnet together. In some embodiments, the plurality of distinct sheaths are configured to separate from the magnet in response to a user's pulling the sheaths and the magnet apart.

A cord management apparatus comprises a magnet, configurable to be coupled to an electronic device, and one or more sheaths configured to be coupled to at least a portion of the electronic cord. The one or more sheaths are configured to be magnetically attached to the magnet. A plurality of sheaths may be magnetically coupled to the magnet and a plurality of magnets may be magnetically coupled to the sheath.

In some embodiments, the one or more sheaths comprises a single sheath having a length greater than half the length of the cord. In some embodiments, the magnet is configured to be coupled to the electronic device by one or more selected from the group consisting of adhesive, Velcro, tension, stretch-fit, heat-shrink, clipping, squeezing, magnetic attachment, and wrapping. In some embodiments, the one or more sheaths comprise a magnetic material. In some embodiments, the one or more sheaths are configured to clip around the cord. In some embodiments, the one or more sheaths are configured to be compressed around the cord. In some embodiments, the one or more sheaths each comprise a plurality of distinct parts.

In some embodiments, the one or more sheaths are configured to be wrapped around the cord. In some embodiments, the one or more sheaths are configured to be threaded around the cord. In some embodiments, the one or more sheaths are configured to be coupled to the cord using an adhesive. In some embodiments, the one or more sheaths are configured to magnetically attach the cord to the magnet, in response to a user touching at least one of the sheaths and the magnet together.

An electronic cord is capable of transmitting an electronic signal, the cord having a first end and a second end. A sheath is coupled to at least a portion of the electronic cord, wherein the sheath is configured to attach the cord to an object. A first connector is electronically coupled to the first end of the electronic cord, wherein the first connector is configured to connect the cord to the object electronically. The second end is configured to be electronically coupled to an electronic device.

In some embodiments, the sheath comprises a magnetic material. In some embodiments, the magnetic material is incorporated in at least a portion of the sheath. In some embodiments, the object comprises one selected from the group consisting of a communications device, an audio device, a multimedia device, an entertainment device, and a personal computing device.

In some embodiments, the magnetic material is magnetized and is configured to attach to an unmagnetized portion of the object. In some embodiments, the magnetic material is unmagnetized and is configured to attach to a magnetized portion of the object. In some embodiments, the magnetic material is configured to attach the cord to itself. In some embodiments, the electronic device is one selected from the group consisting of an audio speaker, an earphone, a power charger, a data plug, a microphone, a controller, and a human interface device. In some embodiments, the sheath comprises a pliable material.

An electronic cord is capable of transmitting an electronic signal, the cord having a first end and a second end. The electronic cord is configured to be attached to an object by a magnetic force. A first connector is electronically coupled to the first end of the electronic cord, wherein the first connector is configured to connect the cord to the object electronically. The second end is configured to be coupled to an electronic device electronically. A plurality of magnets may be coupled to the sheath.

In some embodiments, at least a portion of the electronic cord is unmagnetized and is configured to attach to a magnetized portion of the object. In some embodiments, the magnetized portion of the object includes one selected from the group consisting of a surface, a skin, a battery, a battery cover, an adhesive plate, and a chassis of the object. In some embodiments, the electronic cord is magnetized and is configured to attach to an unmagnetized magnetic portion of the object. In some embodiments, the electronic cord is configured to attach the cord to itself magnetically. In some embodiments, the unmagnetized magnetic portion of the object includes one or more selected from the group consisting of a skin, a battery, a battery cover, an adhesive plate, and a chassis of the object. In some embodiments, the electronic cord comprises magnetic metal.

An electronic cord is capable of transmitting an electronic signal, the cord having a first end and a second end. One or more pliable sheaths surround at least a portion of the electronic cord, wherein the one or more sheaths are configured to prevent tangling of the electronic cord. A first connector is coupled to the first end of the electronic cord electronically, where the first connector is configured to connect the cord to an object electronically. The second end is configured to be coupled to an electronic device electronically. In some embodiments, the electronic cord comprises a magnetic metal.

In some embodiments, the one or more pliable sheaths comprise at least two distinct sheaths. In some embodiments, the pliable material is incorporated through a length of the sheath. In some embodiments, the pliable material is configured to avoid tangling of the cord with itself. In some embodiments, the object comprises one selected from the group consisting of a communications device, an audio device, a multimedia device, an entertainment device, and a personal computing device, and the pliable material is configured to avoid tangling of the cord with the object. In some embodiments, the electronic device comprises one selected from the group consisting of a communications device, an audio device, a multimedia device, an entertainment device, and a personal computing device. In some embodiments, the one or more pliable sheaths comprise a magnetic material.

A cord management device comprises one or more pliable sheaths, the one or more sheaths configured to surround at least a portion of an electronic cord coupled between an electronic device and a headset. The one or more pliable sheaths are configured to prevent tangling of the electronic cord. The one or more pliable sheaths are configured to be bent into and to retain a shape.

A method for manufacturing a cord management apparatus comprises forming one or more magnets, configurable to be coupled to an electronic cord. One or more sheaths are formed, wherein the one or more sheaths are configured to be coupled to at least a portion of the electronic cord, and wherein the one or more sheaths are configured to be magnetically attached to the magnet. In some embodiments, a magnet is formed, wherein the magnet is configurable to be coupled to an electronic device, and the magnet is configured to be magnetically coupled to the one or more sheaths and the one or more magnets configured to be coupled to an electronic cord.

A method for manufacturing a cord management apparatus comprises forming an electronic cord capable of transmitting an electronic signal, the cord having a first end and a second end. A sheath is formed and coupled to at least a portion of the electronic cord, wherein the sheath is configured to magnetically attach the cord to an object. A first connector is formed and is electronically coupled to the first end of the electronic cord, wherein the first connector is configured to electronically couple the cord to the object. The second end of the cord is configured to be electronically coupled to an electronic device.

BRIEF DESCRIPTION OF THE DRAWINGS

Like reference numerals refer to corresponding parts throughout the drawings.

DESCRIPTION OF EMBODIMENTS

Figure 1A:
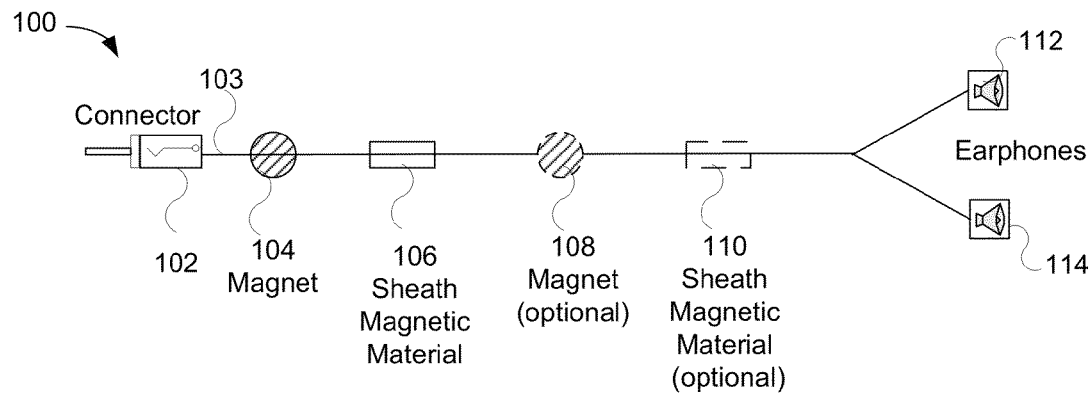
FIGS. 1A-1E illustrate examples of magnets and sheaths coupled to a wire, according to some embodiments.
Figure 1B:
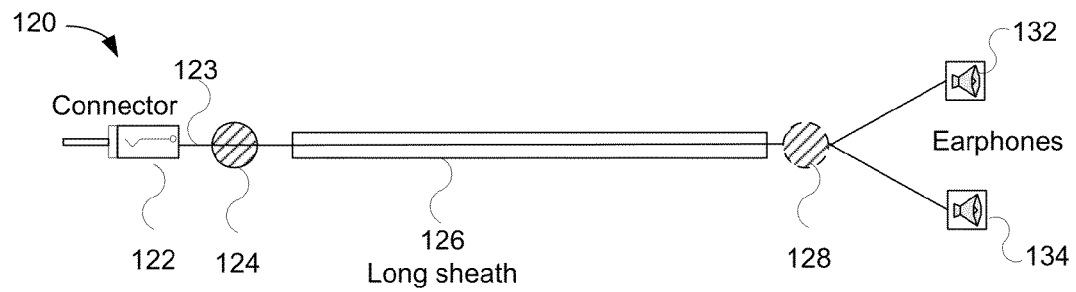
Figure 1C:
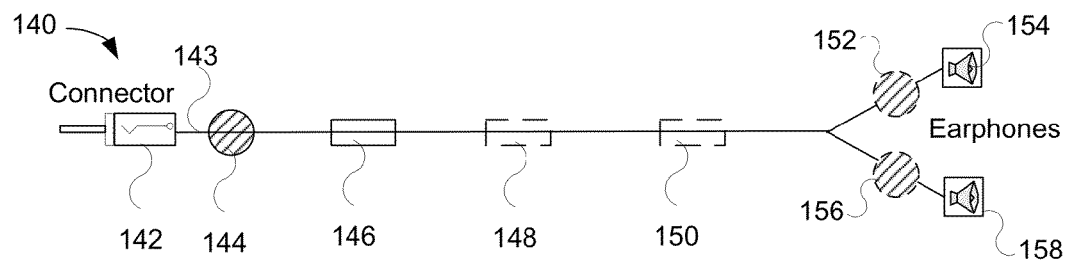
Figure 1D:
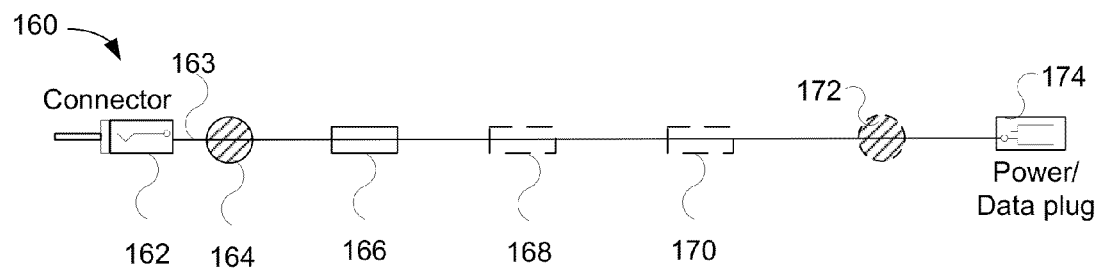
Figure 1E:
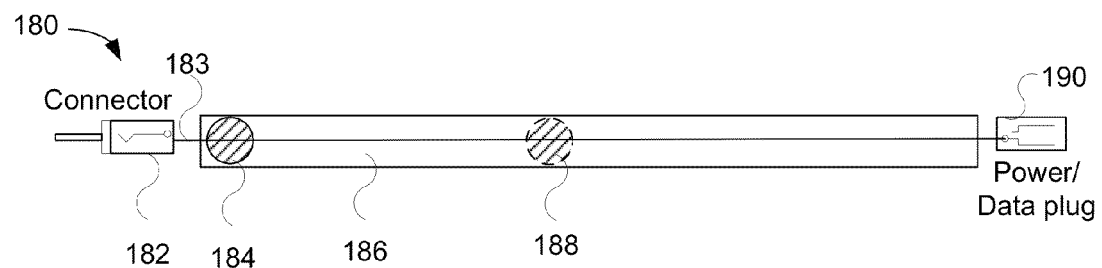
Figure 2A:
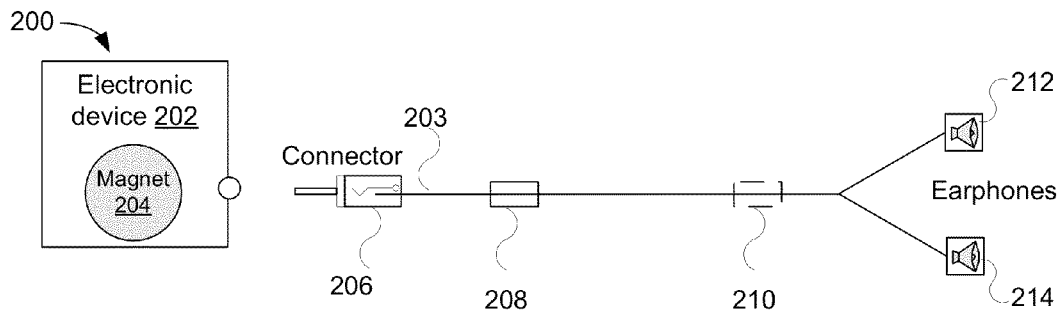
FIGS. 2A-2I illustrate examples of electronic devices, and magnets and sheaths coupled to a wire, according to some embodiments.
Figure 2B:
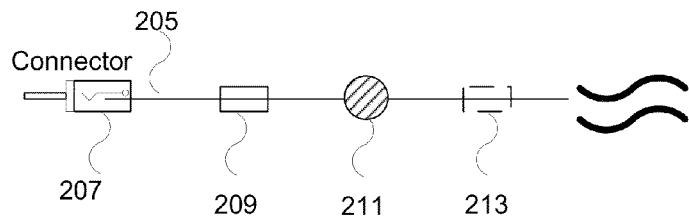
Figure 2C:
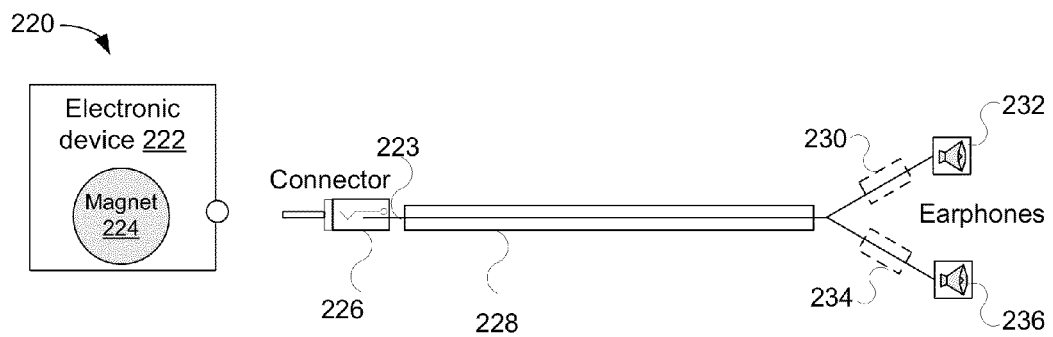
Figure 2D:
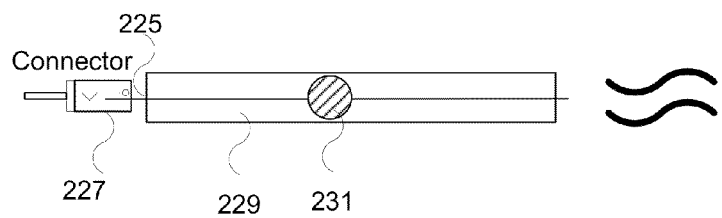
Figure 2E:
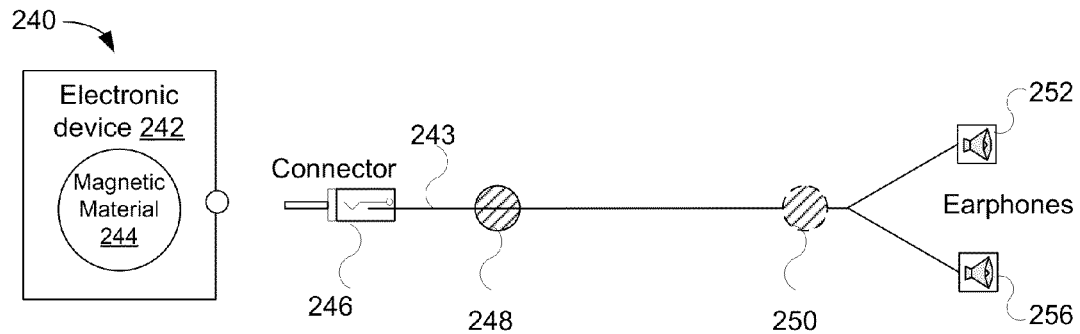
Figure 2F:
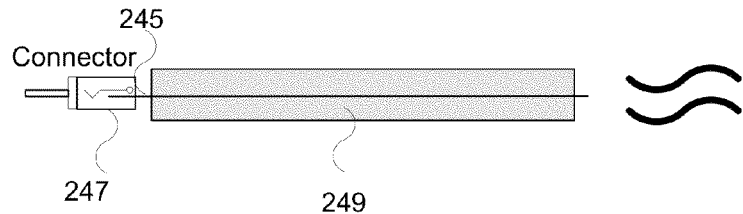
Figure 2G:
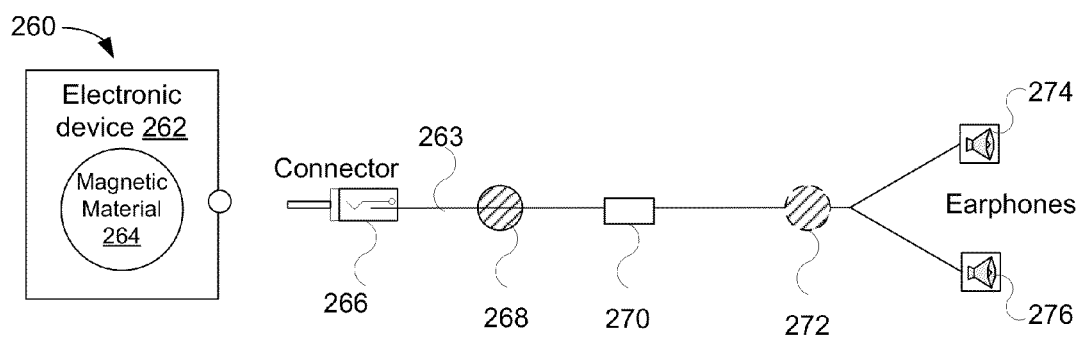
Figure 2H:
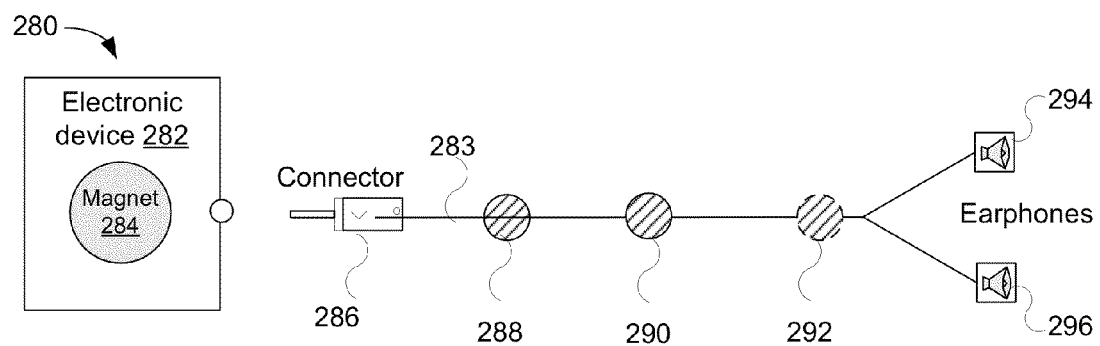
Figure 2I:
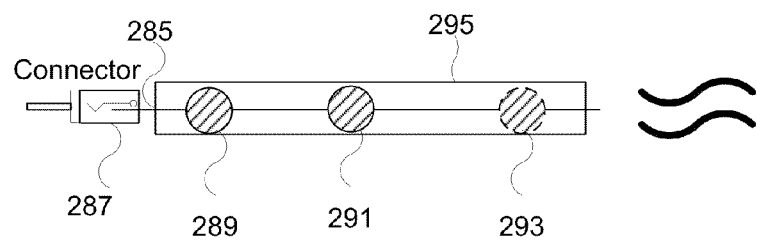

Electronic devices generally require cables for carrying data, multimedia, electronic or audio signals in and out of the device, and for providing power to the device. A typical electronic device, such as a multimedia player device, may require at least one cable for connecting headphones or ear buds. The multimedia player device may also require a cable for providing power to the device, if the device is charging or operating in a powered mode.

Cables are typically fabricated from a lightweight wire, coated in a plastic type cover or protector. These cables are loose and can easily become entangled. In addition, a cable (such as a headset cable) has excess length for most uses, and the excess length may hang loosely and tangle with itself or with other objects. This is inconvenient and frustrating to the user. In addition, if the cable is not stored it can separate from the electronic device and get lost, or be generally inconvenient to the user.

An improved cable management system is described. This system may include a cable having magnetic material or magnets coupled to the cable. This system may include a kit having magnets and/or sheaths having magnetic material, configured to be coupled to a wire by a user. In some embodiments, the magnet includes a cover or shield to shield an electronic device from the magnetic force. In some embodiments, the magnet includes a cover to prevent the magnet from scratching the electronic device. The cover may be colored or textured to help the magnet blend in with the electronic device, so the magnet appears as part of the electronic device. In some embodiments, the magnet is manufactured to be thin (e.g., less than 3 mm, or less than 1 mm, or less than 0.5 mm) depending on a particular application.

FIGS. 1A-1E illustrate examples of magnets and sheaths coupled to a wire, according to some embodiments. A wire 103 (such as a wire used on an audio headset, earphones, video display, microphone, game control device, power supply cord, data cord, etc.) has a connector 102 coupled to a first end of the wire. The connector 102 may be configured to connect to an electronic device, such as a cellular phone, computer, multimedia player, MP3 player, personal digital assistant, camera, power supply, data or network connection, or any other electronic device. In some embodiments, the wire has earphones or ear buds 112 and 114 coupled to a second end of the wire. For simplicity, the ear buds 112 and 114 will be referred to together as the second end of the wire, even though they are on separate strands of wire.

In some embodiments, the earphones or ear buds comprises magnets, and may be magnetically attached to a magnetic or ferrous material. In some embodiments, the wire comprises a microphone having a magnet.

The wire 103 has coupled to it at least one magnet 104. In some embodiments, the magnet 104 may be located anywhere on the wire. In some embodiments, the magnet 104 is located proximate to the connector 102. In some embodiments, a second magnet 108 is optionally positioned on the wire between the first magnet and the second end of the wire.

In some embodiments, the magnet can include one or more of magnetic metallic elements, composite magnets, ceramic or ferrite magnets, alnico magnets, ticonal magnets, injection molded magnets, flexible magnets, and rare earth magnets.

The wire 103 has coupled to it at least one sheath 106, formed from magnetic material. The sheath is formed from a material that is attracted to a magnet, such as a one or more of Cobalt (Co), Iron (Fe), Nickel (Ni), Gadolinium (Gd), Dysprosium (Dy), and compounds such as $FeOFe_2O_3$, $NiOFe_2O_3$, $CuOFe_2O_3$, $MgOFe_2O_3$, $MnBi$, $MnSb$, $MnOFe_2O_3$, $Y_3Fe_5O_{12}$, $CrO_2$, $MnAs$, and $EuO$. Other compounds of combinations of these or other materials may also be used. In some embodiments, Zinc (Zn) or an alloy may be used.

In some embodiments, the magnet and/or sheath may be coupled to the wire by one or more methods including clipping, latching, adhesive, friction, elastic, twisting, wrapping, tying, pressing together, unrolling, rolling, squeezing, heat shrink, ultraviolet (UV) shrink, etc. In some embodiments, the magnet and/or magnetic material may comprise paint, powder, or a solution that is applied to the wire. In some embodiments, the magnet and/or magnetic material dries onto the wire, or sticks to the wire through application of heat, light, radiation, or by other means.

In some embodiments, additional sheaths 110 and/or magnets 108 may be coupled to the wire. These additional sheaths and/or magnets may be distributed along the wire in a uniform manner, in a non-uniform manner, in a random manner, and/or a combination of these.

In some embodiments, the magnet 104, sheath 106, and any additional magnets 108 or sheaths 110 form a kit, configured for application to a wire by a purchaser of the kit. In some embodiments, the magnet 104, sheath 106, and any additional magnets 108 or sheaths 110 are coupled to a wire prior to sale of the wire. In some embodiments, the wire or sheath itself is magnetic.

In an embodiment 120, a wire 123 is coupled to a connector 122, the wire having coupled to it a magnet 124 and a long sheath 126. In some embodiments, the long sheath 126 covers at least half of the length of the wire. In some embodiments, the long sheath 126 covers at least a third of the length of the wire. In some embodiments, the long sheath comprises a plurality of smaller sheaths. In some embodiments, the wire has coupled to it a second magnet 128, coupled such that the long sheath 126 is between the first magnet 124 and the second magnet 128.

The connector 122 may be configured to connect to an electronic device, and, the wire may be coupled to earphones or ear buds 132 and 134, as described.

In an embodiment 140, a wire 143 is coupled to a connector 142, the wire having coupled to it a magnet 144 and a sheath 146. In some embodiments, the wire has coupled to it one or more additional sheaths 148, 150. In some embodiments, the wire has coupled to it one or more additional magnets 152, 156, coupled on branches proximate to earphones 154, 158.

In an embodiment 160, a wire 163 is coupled at a first end to a connector 162, the wire having coupled to it a magnet 164 and a sheath 166. In some embodiments, the wire has coupled to it one or more additional sheaths 168, 170. In some embodiments, the wire is coupled to one or more additional magnets 172. In some embodiments, the wire is coupled at a second end to a power or data plug 174.

In an embodiment, 180, a wire 183 is coupled at a first end to a connector 182, the wire being coupled to a magnet 184 and a sheath 186, where at least a portion of the magnet 184 and sheath 186 are overlapping. In some embodiments, the magnet 184 is part of the sheath 186. In some embodiments, one or more additional magnets 188 are coupled to the wire or to the sheath.

In some embodiments, the wire is coupled at a second end to a power or data plug 190.

The embodiments illustrated allow a wire, such as a headset wire or power or data wire to be easily bunched up (e.g., by grasping) and remain bunched together. The combination of magnets and sheaths that are attracted to magnets means that if they are brought into proximity (e.g., by a bunching, squeezing, grasping action) then the wire will remained bunched together, and not uncoil or flop around loosely. This can help prevent the wire from becoming tangled with itself or with other objects.

FIGS. 2A-2D illustrate examples of electronic devices, and magnets and sheaths coupled to a wire, according to some embodiments. In an embodiment 200, an electronic device 202 comprises a magnet 204. In some embodiments, the magnet 204 is coupled to the outside of the electronic device. In some embodiments, the magnet 204 is inside the electronic device, such as inside a battery compartment, storage compartment, etc. In some embodiments, the magnet 204 is formed as part of the electronic device. In some embodiments, the magnet is part of a kit, such as the kit described with regard to FIGS. 1A-1D, and the magnet is configured to be coupled to the electronic device by a purchaser or user of the kit. In some embodiments, the magnet is coupled to the electronic device by adhesive, by Velcro (hook and loop fastener), by a stretch-fit band or skin, by a press-fit mechanism, by a leather, metal or plastic case, or by other attachment means. In some embodiments, a magnet or magnetic material coupled to the electronic device can be thin and unobtrusive, such that it does not substantially change the shape and/or appearance of the electronic device. In some embodiments, the magnet or magnetic material may be colored. In some embodiments, the magnet or magnetic material may be phosphorescent (glow in the dark).

A cord or wire 203 comprises a connector 206 coupled to a first end of the wire. The connector may be configured to be coupled to the electronic device 202, e.g., to carry audio or multimedia signals from the electronic device to one or more earphones 212, 214 coupled to a second end of the wire. The cord 203 comprises a sheath 208, wherein the sheath comprises a magnetic material, such as a material that is attracted to the magnet 204. In some embodiments, the cord 203 comprises one or more additional sheaths 210, also comprising magnetic material.

The sheath(s) enable the cord to be grasped or squeezed into a bunch and placed on or near the magnet 204 of the electronic device 202. The sheaths are attracted to the magnet 204, and thus the cord stays at the magnet 204, and due to the magnetic force does not unbunch or flop loosely. This reduces the likelihood of the cord knotting, or of the cord becoming tangled in other objects. In addition, this helps store and manage the cable so it does not separate from the device and become lost.

In some embodiments, a cord/wire 205 having a connector 207 coupled to a first end may also have a magnet 211 coupled to the cord. The magnet 211 facilitates in the bundling of the cord 212, as it may aid in keeping the sheaths 209, 213 bundled, thus making it easier to couple the cord 212 to the magnet 204 and to secure it there. In some embodiments, the magnet 211 has a polarity such that it is attracted to the magnet 204 coupled to the electronic device.

In an embodiment 220, an electronic device 222 comprises a magnet 224, as described. In some embodiments, the magnet 224 is coupled to the outside or inside of the electronic device, as described.

In some embodiments, a cord/wire 223 having a connector 226 coupled to a first end has a long sheath 228 coupled to the cord. In some embodiments, the long sheath covers at least half the length of the wire from the first end to a second end. The long sheath comprises a magnetic material, as described, which may be attracted to the magnet 224, as described. The long sheath facilitates the bunching of the cord 223 and magnetic attachment of the bunched cord to the device 222.

In some embodiments, one or more additional sheaths 230, 234, comprising magnetic material, may be coupled to earphone branches 232, 236 at the second end of the cord. The additional sheaths may facilitate the cord being bunched and magnetically coupled to the magnet 224.

In some embodiments, a cord/wire 225 having a connector 227 coupled to a first end has a long sheath 229 coupled to the cord. The long sheath 229 may comprise one or more magnets 231 coupled within or around the sheath 229. The one or more magnets may aid the long sheath in bunching and being coupled to the magnet 224.

FIGS. 2E-2I illustrate examples of electronic devices, and magnets and sheaths coupled to a wire, according to some embodiments.

In an embodiment 240, an electronic device 242 comprises a magnetic material 244, as described. The magnetic material (e.g., a steel plate, a battery having magnetic metal, a battery cover having magnetic metal, etc.) may be attracted to a magnet, and may allow a magnet to stick to it. This is useful as a cord having one or more magnets can magnetically attach to the magnetic material on the electronic device 242, thus reducing the likelihood of tangling or knotting, or separating from the device and becoming lost.

A cord 243 has a connector 246 coupled to a first end, and has one or more earphones 252, 256 coupled to a second end. The cord 243 comprises a magnet 248 coupled to the cord. In some embodiments, the magnet 248 is coupled proximate to the connector 246. In some embodiments, proximate to means that the magnet is coupled within two inches of the connector. In some embodiments, proximate to means that the magnet is coupled within six inches of the connector. In some embodiments, the magnet 248 is within a distance of approximately half the length of the cord (i.e., the length from the first end to the second end) to the connector.

In some embodiments, one or more additional magnets 250 are coupled to the wire 243. These additional magnets aid in gathering and magnetically coupling or bunching the wire to the magnetic material 243.

In some embodiments, a wire 245 has a connector 247 coupled to a first end, and a long magnetic sheath 249 coupled to the wire. In some embodiments, the long magnetic sheath 249 facilitates gathering the wire and bunching it, prior to attaching it to the magnetic material 244 magnetically, as described.

In an embodiment 260, an electronic device 262 comprises a magnetic material 264, as described. A cord 263 has a connector 266 coupled to a first end, and has one or more earphones 274, 276 coupled to a second end.

The cord 263 comprises a magnet 268 coupled to the cord. In some embodiments, the magnet 268 is coupled proximate to the connector 266, as described. In some embodiments, the magnet 268 is within a distance of approximately half the length of the cord (i.e., the length from the first end to the second end) from the connector.

The cord 263 has a sheath 270 comprising magnetic material, as described. In some embodiments, this is a long sheath, as described. The sheath assists with bunching the cord together, as the sheath is attracted to the magnet 268. In some embodiments, one or more additional magnets 272 are coupled to the wire 263. These additional magnets further aid in gathering and magnetically coupling the bunched wire to the magnetic material 263.

In an embodiment 280, an electronic device 282 comprises a magnet 284, as described. A cord 283 has a connector 286 coupled to a first end, and has one or more earphones 294, 296 coupled to a second end. The cord comprises a plurality of magnets 288, 290, where these magnets are attracted to each other and to the magnet 284 on electronic device 282. In some embodiments, additional magnets 292 may be coupled to the cord. The magnets aid in gathering and magnetically coupling the wire 283 to the electronic device 282.

In an embodiment, a wire 285 comprises a connector 287 coupled to a first end. A long sheath 295 is coupled to the wire 285, where the sheath comprises a magnetic material, as described. The sheath may comprise or cover a plurality of magnets 289, 291, and optionally 293 within or around the body of the sheath. The combination of sheath with magnets together may assist in gathering and magnetically coupling the wire together in a bunch, and in magnetically coupling the bunched wire to the electronic device 282. The combination of sheath with magnets together may also make the wire more bendable (i.e., less loose or floppy) and less likely to tangle than just a simple wire having magnets or smaller sheaths attached.

FIGS. 3A-3D illustrate examples of electronic devices, and magnets and sheaths coupled to a wire, according to some embodiments. In some embodiments, a strip of magnetic metal runs through or around or inside the wire, or a combination of these. In some embodiments, the sheath of the electronic wire is magnetic. In some embodiments, the electronic wire is magnetic. In some embodiments, the electronic wire is formed from a material that is attracted to a magnet.

In an embodiment 300, an electronic device 302 comprises a magnet 304, as described. A cord 308 has a connector 306 coupled to a first end, as described, and has one or more earphones 310, 312 coupled to a second end. The cord 308 may be formed from a material that is attracted to a magnet, such as a flexible ferrous or ferromagnetic alloy wire. In some embodiments, the cord 308 may have several distinct strands, each carrying separate signals (e.g., left and right stereo, in an audio application). In some embodiments, the cord comprises a cover (e.g., a rubber or plastic cover) over a wire, where the wire inside is magnetized. In some embodiments, a conventional wire (e.g., copper) is coupled with a magnetic wire or magnetic material inside a cover. In some embodiments, the earphones 310, 312 comprise magnets.

The cord 308 may be grasped together, bunched, and placed near to the magnet 304, where it will be magnetically coupled to the device. Grasping the cord 308 together alone (i.e., not near the electronic device 302 having magnet 304) will not cause the cord to stay bundled together, since there is no magnet to hold it in position.

In an embodiment 320, an electronic device 322 comprises a magnet material 324, such as ferrous or ferromagnetic alloy as described. A cord 328 has a connector 326 coupled to a first end, and has one or more earphones 330, 332 coupled to a second end. The cord 328 may be magnetized. In some embodiments, the cord 328 is magnetized before being assembled into a set of headphones. In some embodiments, the cord is magnetized after being assembled into a set of headphones.

The cord 328 may be grasped and bunched together such that it will become magnetically attached to itself, i.e., it will stay together and not become loose or floppy. In some embodiments, the cord is magnetized such that portions of cord are attracted to other portions of the cord. In some embodiments, the cord is magnetized with alternating poles along the cord.

The cord 328 may be grasped and bunched together and placed near to the electronic device 322, having magnetic material 324. The bunched cord will magnetically attach to the electronic device 322, and stay bundled together. This prevents the cord from becoming tangled in itself or in other objects, or from separating from the electronic device and becoming lost.

In an embodiment 340, an electronic device 342 comprises a magnet material 344, as described. A cord 348 has a connector 346 coupled to a first end, and has one or more earphones 352, 354 coupled to a second end. The cord 348 may be encased by magnetic cover or sheath 350, such as mesh shielding around a central cord or cords, where the shielding is magnetized. In some embodiments, the cord 348 is manufactured with the magnetized shielding around it. In some embodiments, the shielding is magnetized after the cord is manufactured. This embodiment may be useful where a non-magnetic wire 348 is required, such as a copper wire, or for example an optical fiber, etc.

In an embodiment 360, an electronic device 362 comprises a magnet material 364, as described. A cord 368 has a connector 366 coupled to a first end, and has a power or data plug 372 coupled to a second end. The cord 368 may be encased by magnetic cover or sheath 370, as described. In some embodiments, the cord 368 is manufactured with the magnetized shielding around it. In some embodiments, the shielding is magnetized after the cord is manufactured, as described.

In some embodiments, the cord may have a plurality of branches, such as branches for multiple audio, microphone, controller, video, data or power connectors or devices, or combinations thereof. In some embodiments, the cord may have a combination of magnetic and non-magnetic portions in the sheath. In some embodiments, the cord may have a plurality of sheaths with segments or dividers between them.

Figure 4A:
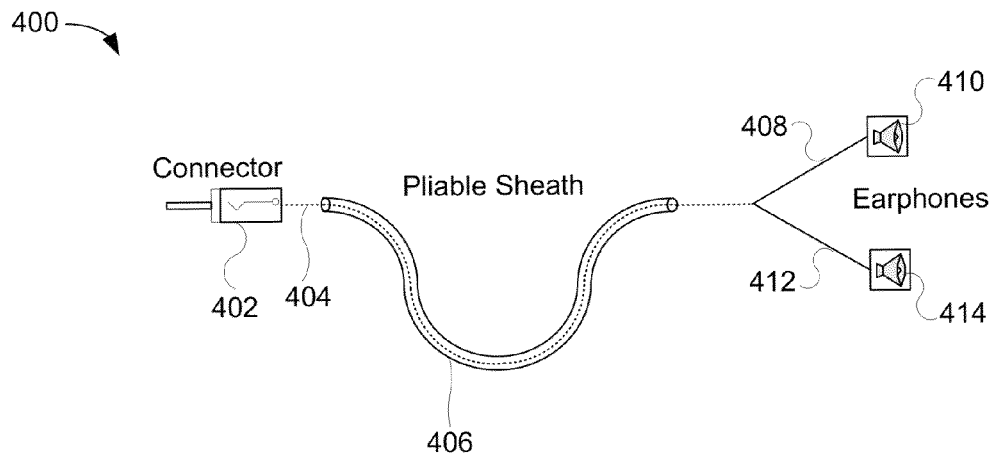
FIGS. 4A-4C illustrate examples of pliable sheaths configured to be coupled to a wire, according to some embodiments.
Figure 4B:
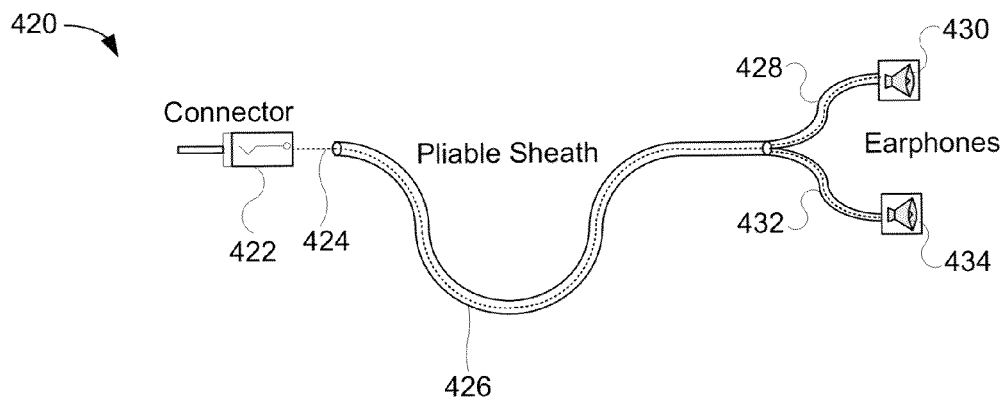
Figure 4C:
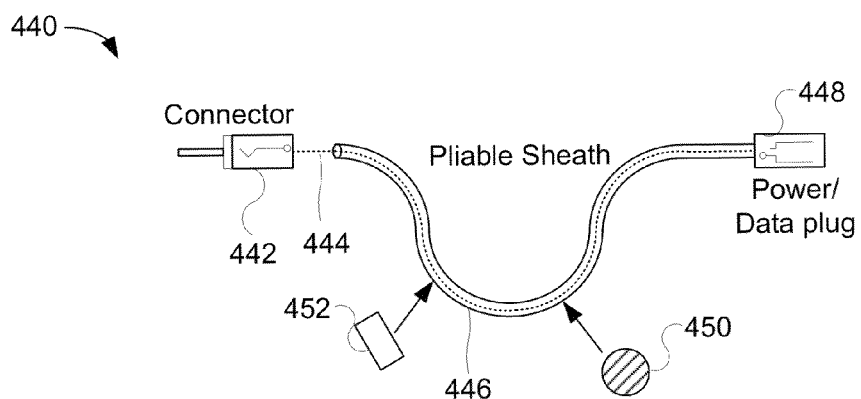
Figure 5A:
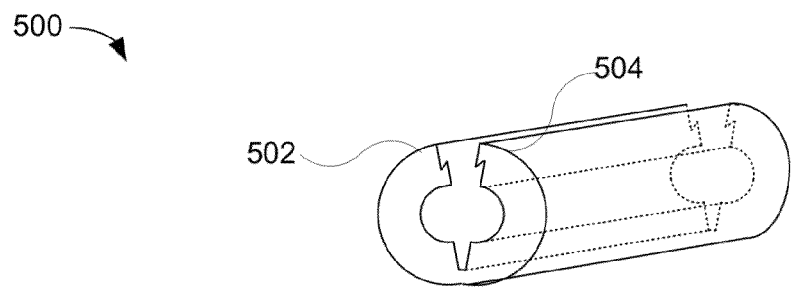
FIGS. 5A-5E illustrate examples of connectors that may be used to couple magnets or sheaths to a wire, or over a sheath, according to some embodiments.
Figure 5B:
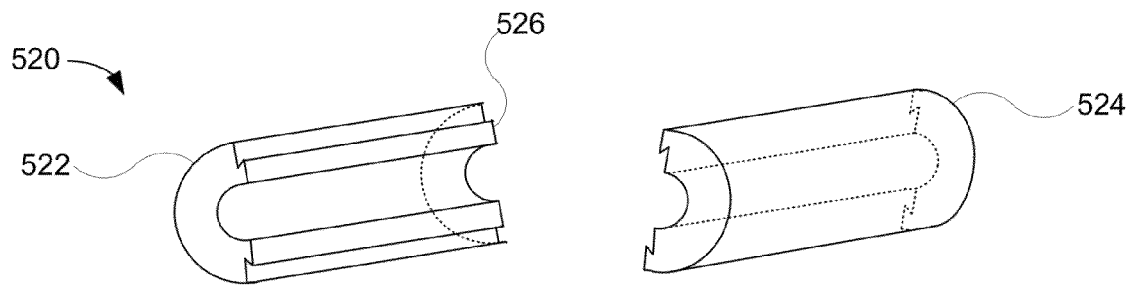
Figure 5C:
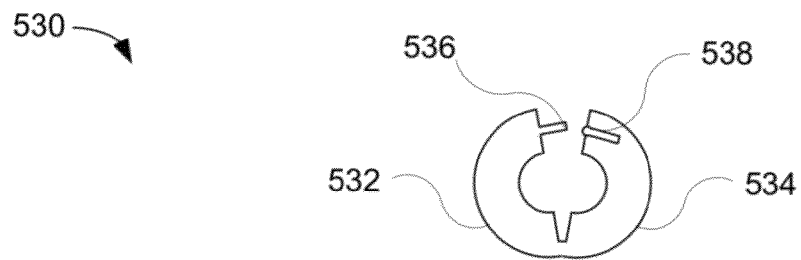
Figure 5D:
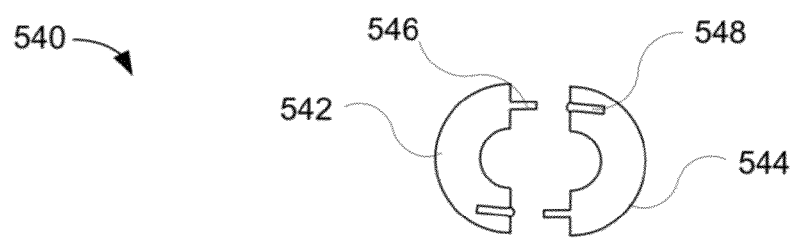
Figure 5E:
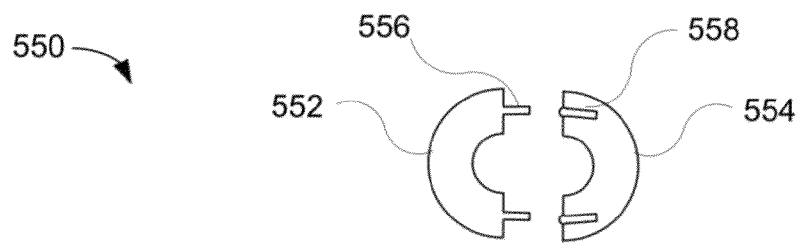
Figure 6A:
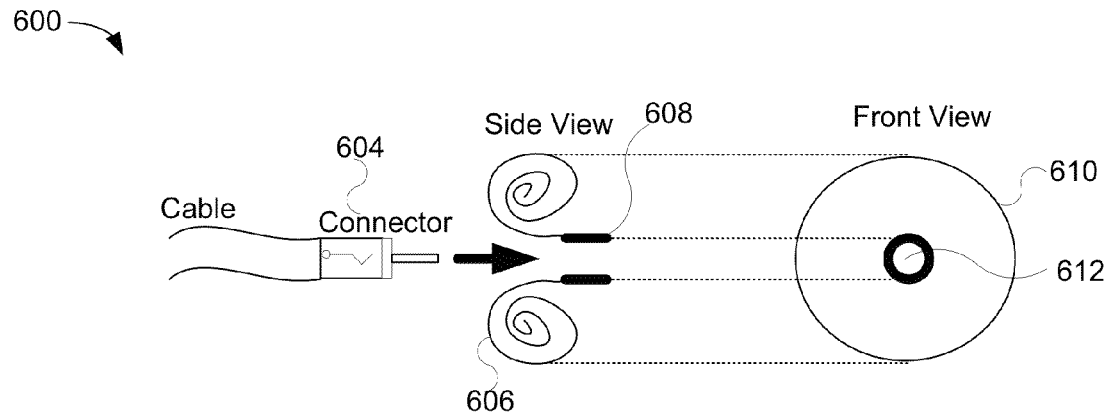
FIGS. 6A-6E illustrate examples of sheaths that may be coupled to a wire, or over a sheath, according to some embodiments.
Figure 6B:
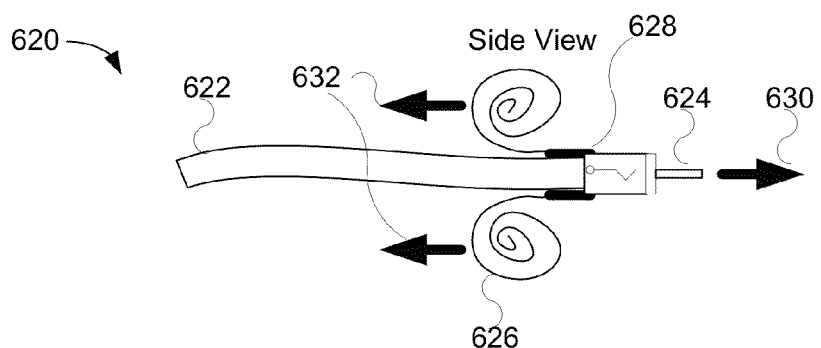
Figure 6C:
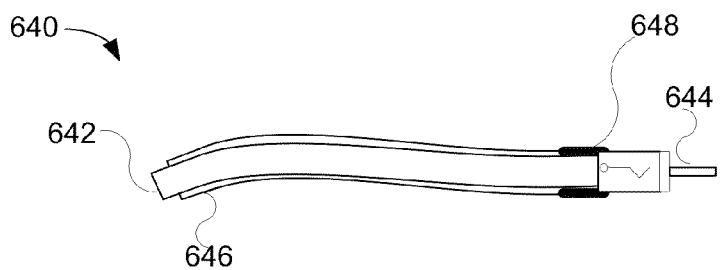
Figure 6D:
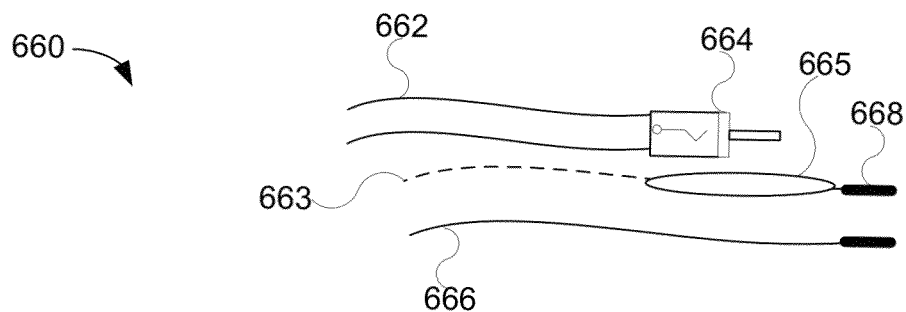
Figure 6E:
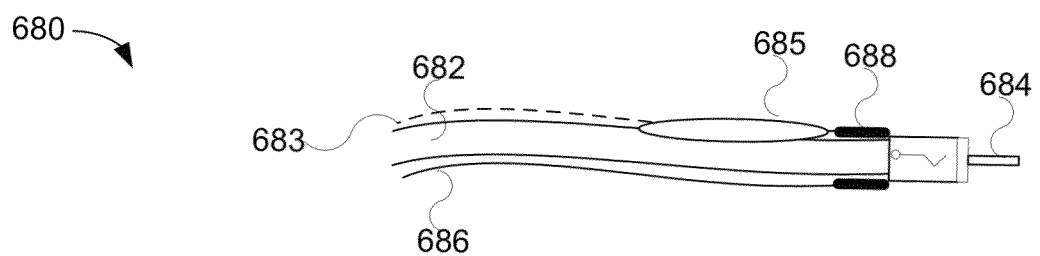

FIGS. 4A-C illustrate examples of pliable sheaths for use with a wire, according to some embodiments. A pliable sheath is one that is flexible, supple, ductile, or easily bends without breaking. In some embodiments, the sheath comprises a silicone material. In some embodiments, the pliable sheath comprises a rubber material. In some embodiments, the sheath comprises a plastic material. In some embodiments, the sheath comprises a woven material. In some embodiments, the sheath comprises an organic material. In some embodiments, the sheath comprises a metallic material. In some embodiments, the sheath comprises one or more of these materials.

In an embodiment 400, a wire 404 has a connector 404 coupled at a first end, and a plurality of earphones 410 and 414 coupled to branches 408, 412 respectively at a second end. A flexible or pliable sheath 406 is coupled around the wire 404, such that the sheath covers a portion of the wire between the first end and the second end. In some embodiments, the sheath covers at least half the length of the wire between the first end and the second end.

In some embodiments, the pliable sheath is configured to be coupled to a wire (such as an audio cable, a video cable, a data cable, a power cable, etc.) by a user. The sheath may be coupled to the wire by squeezing, clipping, snapping, unrolling, wrapping, twisting, by adhesive means, or by other means.

The pliable sheath functions to make the cable assembly (wire, sheath, connector and earphones) less loose/floppy than in the unsheathed state. The pliable sheath reduces the likelihood of the wire tangling with itself or with other objects. The sheath may be configured with a smooth, slick, or slippery surface such that it is more likely to glide over itself, and not get caught due to friction etc. The sheath may be configured to un-bunch (i.e., separate out to its full length) in response to a user pulling or shaking the cable assembly. This is advantageous, in that a user can simply shake the cable assembly to return it to its full length, making it easier and more intuitive to use than conventional earphones or headsets, etc. The sheath may also act as a shield or protector to reduce damage to the wire 404. The smooth sheath may also prevent hair, jewelry, etc. from getting tangled in the wire and/or earphones. In some embodiments, the sheath may be designed to have memory, i.e., to attempt to keep the shape in which it was last configured. In some embodiments, the sheath may be bendable, so that a user can bend the sheath to a desired shape or configuration.

In an embodiment 420, a wire 424 has a connector 422 coupled at a first end, and a plurality of earphones 430 and 434 coupled to branches 428, 432 respectively at a second end. A flexible or pliable sheath 426 is coupled around the wire 424, such that the sheath covers the wire substantially fully between the first end and the second end, i.e., the sheath covers both wire portion 424 and branches 428 and 432. In some embodiments, the sheath may cover less than the full length of the wire.

In an embodiment 440, a wire 444 has a connector 442 coupled at a first end, and a power and/or data plug coupled to a second end 448. A flexible or pliable sheath 446 is coupled around the wire 444, such that the sheath covers the wire substantially fully between the first end and the second end.

In some embodiments, one or more optional magnets 450 and/or magnetic material sheaths 452 are coupled to the pliable sheath 446, or are formed as part of the pliable sheath.

In some embodiments, the pliable sheath 446 may be sold separately from the headphones, data or power wires 404, 424, or 444, such that a user purchases the sheath and applies it to an existing wire. In some embodiments, the pliable sheath may be sold as a kit with one or more magnets 450 and/or magnetic material 452. In some embodiments the kit may also comprise one or more magnets of pieces of magnetic material configured to be coupled to an electronic device, such as a phone, computer, personal digital assistance, audio or multimedia player, email device, etc. In some embodiments, the pliable sheath may be sold with a length suitable for application on a typical set of headphones, such as headphones configured for use with or supplied with products such as an MP3 player, a cellular phone, a laptop computer, a video player, etc. In some embodiments, the pliable sheath may be sold with a standard length (e.g., a meter, a yard, etc.) suitable for trimming, cutting, or tearing by a user to fit a particular application.

In some embodiments, the pliable sheath 446 and/or the magnets 450 and/or magnetic material 452 may be colored, textured, or imprinted with a logo, design, or message.

In some embodiments, a pliable sheath may be stretched over the wire, where the stretching action causes the sheath to tighten up around the wire, thus forming a close bond to the wire.

FIGS. 5A-5E illustrate examples of connectors that may be used to couple magnets or sheaths to a wire, or over a sheath, according to some embodiments.

In an embodiment, a hinged sheath (or a magnet) 500 is configured to be coupled over a wire or over a pliable sheath. The sheath comprises a first portion 502 and a second portion 504. The first and second portions are configured to close (e.g., by snapping or squeezing together) such that when closed, the sheath stays closed. The closing mechanism can include a pair of opposable catches (as illustrated), any other click or snap closing mechanism. In some embodiments, the magnet and/or sheath can be coupled to the wire using clips, by being wrapped in tape, using adhesive, etc.

This is a convenient and easy way for a user to apply a sheath (or magnet) to a wire by simply closing the sheath around the wire and squeezing it shut. In some embodiments, the sheath is designed such that the force required to close it is low enough that a young person (e.g., a child), or an older person (e.g., with arthritis or stiff hands) or a person with a manual disability should be able to use it. In some embodiments, the sheath is designed such that it can be opened and removed from a wire without damage if a user desires. In some embodiments, the sheath is designed such that it cannot be opened or removed from a wire, i.e., it is permanently coupled to the wire.

In some embodiments, the sheath (or magnet) 500 may be cylindrical, spherical, or any other shape according to a particular implementation. As described, the sheath (or magnet) may have colors, designs, logos, messages, letters, numbers, etc.

In an embodiment, a sheath (or magnet) 520 comprises a plurality of parts (e.g., a first half 522 and a second half 524). The first and second half comprise opposable joints 526, which close and lock when squeezed or snapped together. The first half and second half are configured to be placed around a wire and closed, thus securing the sheath around the wire.

In an embodiment, a sheath or magnet 530 comprises a first hinged portion 532 having a first pin or tongue 536, and comprises a second hinged portion 534 having a hole or groove 538. The sheath or magnet 530 is configured to be squeezed or snapped closed around a wire such that the tongue and groove mate together and keep the sheath or magnet fixed around the wire.

In an embodiment, a sheath or magnet 540 comprises a first portion 542 having a first pin or tongue 546 and corresponding groove, and comprises a second hinged portion 544 having a second hole or groove 548 and a corresponding pin. The sheath or magnet 540 is configured to be squeezed or snapped closed around a wire such that the respective tongues and grooves mate together and keep the sheath or magnet fixed around the wire.

In an embodiment, a sheath or magnet 550 comprises a first portion 552 having a first pair of pins 556, and comprises a second hinged portion 554 having first pair of grooves 558. The sheath or magnet 550 is configured to be squeezed or snapped closed around a wire such that the tongues and grooves mate together and keep the sheath or magnet fixed around the wire.

Various combinations of the closing mechanisms described above, or of other mechanisms, could be used in different embodiments, while still falling within the scope and spirit of the described claims and invention, including using adhesive, tape, clips, stretching, etc.

FIGS. 6A-6E illustrate examples of sheaths (such as sheaths having magnetic material or magnets) that may be coupled to a wire, or over a sheath, according to some embodiments.

In an embodiment 600, a sheath is configured to have a magnet 608 portion and a rolled or folded portion 606. The magnet 608 corresponds to a sheath neck 612 and the rolled portion 606 corresponds to a sheath body 610, when seen in a front view.

The sheath is configured to have a wire with connector 604 inserted through the neck magnet 608, and to have the sheath body 606 unrolled over the wire to cover it. In some embodiments, the sheath and/or neck are stretchy so that the connector can be passed through it, with the neck and sheath squeezing back around the wire to ensure a tight fit.

In an embodiment 620, a sheath neck 628 has a wire 622 with connector 624 inserted (arrow 630) through it, and the sheath body 626 is unrolled (arrow 632) to cover the wire. In some embodiments, when the sheath is unrolled and/or stretched by a user, it tightens up around the wire and forms a close fit or bond around the wire.

In an embodiment 640, a wire 642 is covered by a sheath body 646 having a sheath neck 648, over a connector 644. Thus the wire 642 may now be protected from damage, and is less likely to tangle or knot. In addition, the wire can be bunched together and held in place by a magnetic force from magnet 648 and/or additional magnets coupled to the wire or to an electronic device. In some embodiments, the sheath comprises magnetic material, such that the magnetic material is attracted to the neck magnet.

In an embodiment 660, a wire 662 has a connector 664 coupled to a first end. A sheath 666 comprises a neck 668 (as described) and a body, wherein the body has an opening 665 and a joint 663. The joint 663 may be closed using any of the techniques described, or may be designed to curl closed (i.e., so the sides overlap and retain a wire inside).

The sheath 666 is configured such that a user can insert a connector and wire through the neck via the opening 665, and close the joint 663 portion around the wire 662, thus keeping the wire 662 in place.

In an embodiment 680, a wire 682 is coupled to and inside a sheath 686, and is held in place inside the sheath by neck 688 and closed joint 683, as described. A connector 684 coupled to the wire 682 allows the wire to be connected to an electrical device, such as an audio player, etc.

Figure 7:
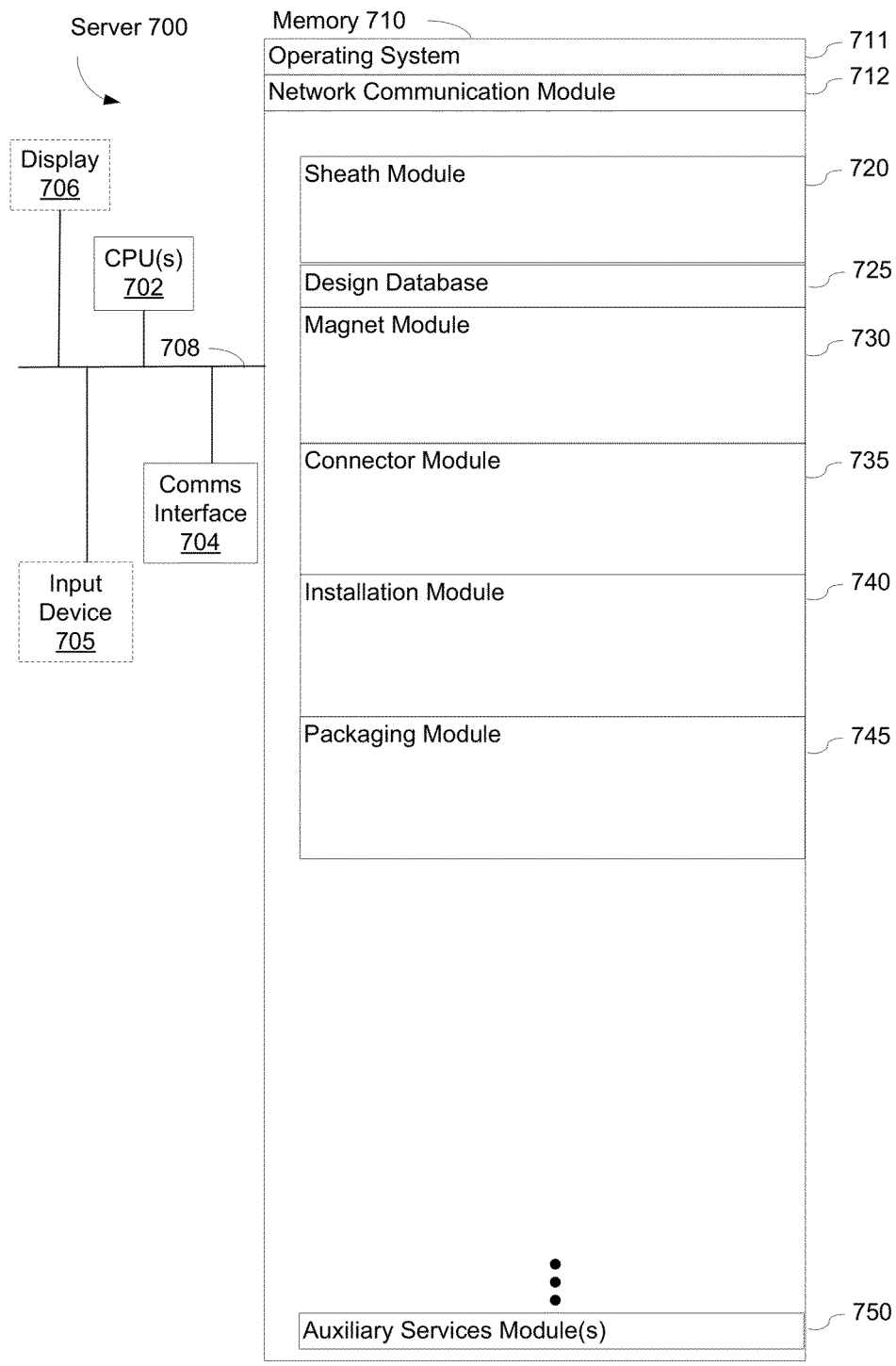
FIG. 7 illustrates a computer system for designing or manufacturing magnetic cord management devices.

FIG. 7 is a block diagram illustrating a server system 700 in accordance with one embodiment of the present invention. In some embodiments the system 700 is a design server system. In some embodiments, the system 700 is a manufacturing server system. The server system 700 typically includes one or more processing units (CPU's) 702, one or more network or other communications interfaces 704, memory 710, and one or more communication buses 708 for interconnecting these components. The server system 700 optionally may include a user interface comprising a display device 706 and an input device 705. Memory 710 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 710 may optionally include one or more storage devices remotely located from the CPU(s) 702. Memory 710, or alternately the non-volatile memory device(s) within memory 710, comprises a computer readable storage medium. In some embodiments, memory 710 stores the following programs, modules and data structures, or a subset thereof:

- an operating system 711 that includes procedures for handling various basic system services and for performing hardware dependent tasks;
- an optional network communication module 712 that is used for connecting the system 700 to other computers via the one or more communication network interfaces 704 (wired or wireless) and one or more communication networks, such as the Internet, other wide area networks, local area networks, metropolitan area networks, and so on;
- a sheath module 720 that includes instructions for design and/or manufacture of sheaths, as described;
- a design and/or manufacturing database containing data related to design and/or manufacture of wires, sheaths, and magnets as described;
- a magnet module 730 that includes instructions for design and/or manufacture of magnets, as described;
- a connector module 735 that includes instructions for design and/or manufacture of connectors used to connect sheaths and/or modules to a wire, as described;
- an installation module 740 that includes instructions for design and/or manufacture of a wire having installed magnets and/or sheaths, as described;
- a packaging module 745 that includes instructions for packaging of wires and/or magnets and/or sheaths, as described; and
- an auxiliary services module 745 that includes instructions for performing auxiliary services, such as maintenance, database management, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

Although FIG. 7 shows a "server system," FIG. 7 is intended more as functional description of the various features which may be present in a set of servers or computers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement such a system and how features are allocated among them will vary from one implementation to another.

Figure 8A:
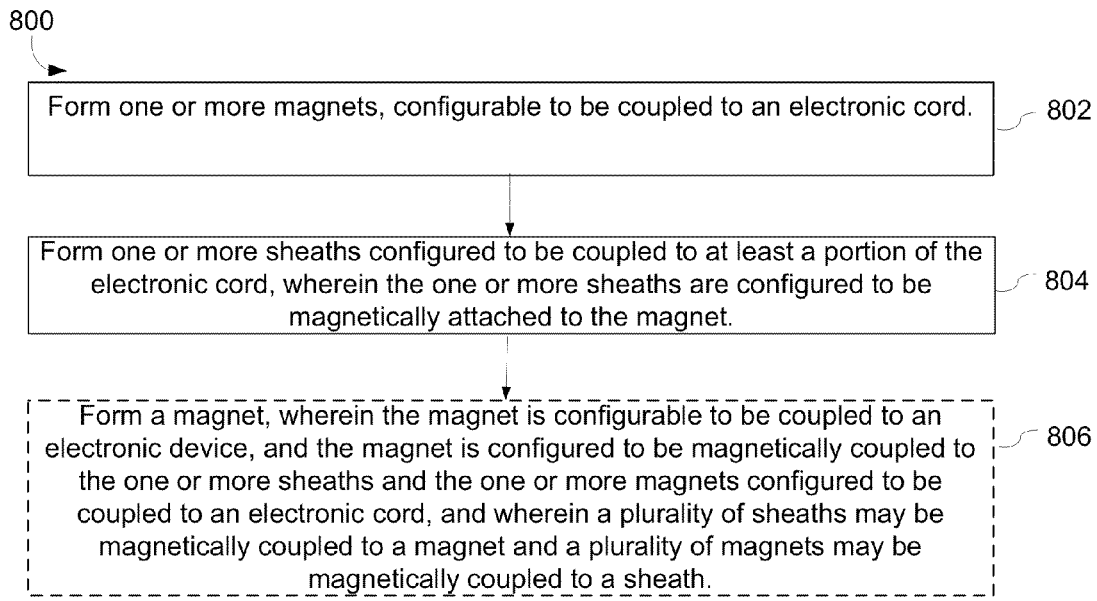
FIGS. 8A-8B illustrate methods for designing or manufacturing magnetic cord management devices.
Figure 8B:
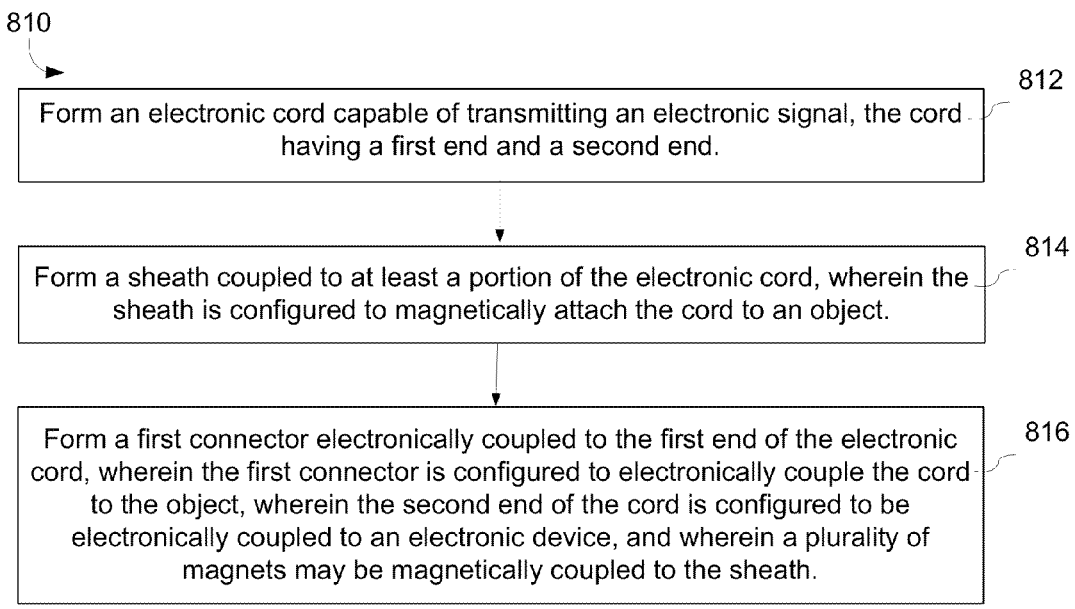

FIGS. 8A-8B illustrate methods for designing or manufacturing magnetic cord management devices.

FIG. 8A is a flowchart representing a server method 800 for designing or manufacturing magnetic cord management devices, according to certain embodiments of the invention. Server method 800 may be governed by instructions that are stored in a computer readable storage medium and that are executed by one or more processors of one or more servers. Each of the operations shown in FIGS. 8A-8B may correspond to instructions stored in a computer memory or computer readable storage medium, as described. The computer readable instructions stored on the computer readable storage medium are in source code, assembly language code, object code, or other instruction format that is interpreted by one or more processors.

In server method 800 for FIG. 8A, one or more magnets (e.g., magnet 104, FIG. 1A) are formed (802), configurable to be coupled to an electronic cord.

One or more sheaths (e.g., sheath 106, FIG. 1A) are formed (804), configured to be coupled to at least a portion of the electronic cord, wherein the one or more sheaths are configured to be magnetically attached to the magnet.

In some embodiments, a magnet (e.g. magnet 204, FIG. 2A) is formed (806), wherein the magnet is configurable to be coupled to an electronic device. The magnet is configured to be magnetically coupled to the one or more sheaths and the one or more magnets configured to be coupled to an electronic cord.

In server method 810 of FIG. 8B, an electronic cord having a first end and a second end is formed (812), capable of transmitting an electronic signal.

Figure 3A:
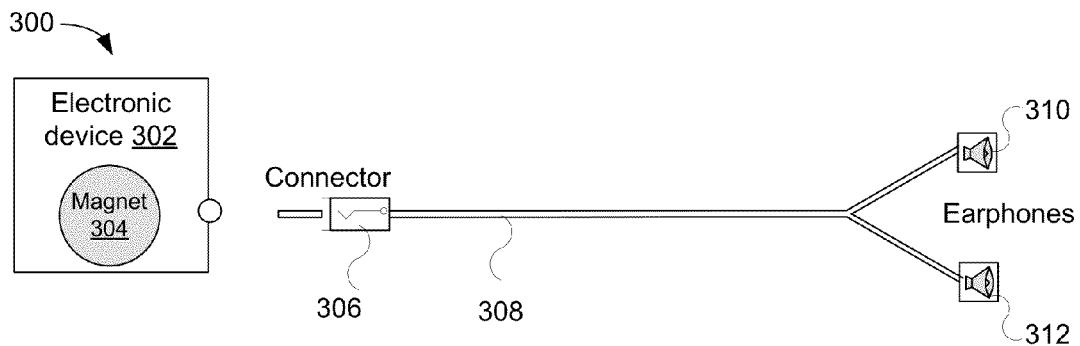
FIGS. 3A-3D illustrate examples of electronic devices, and magnets and sheaths coupled to a wire, according to some embodiments.
Figure 3B:
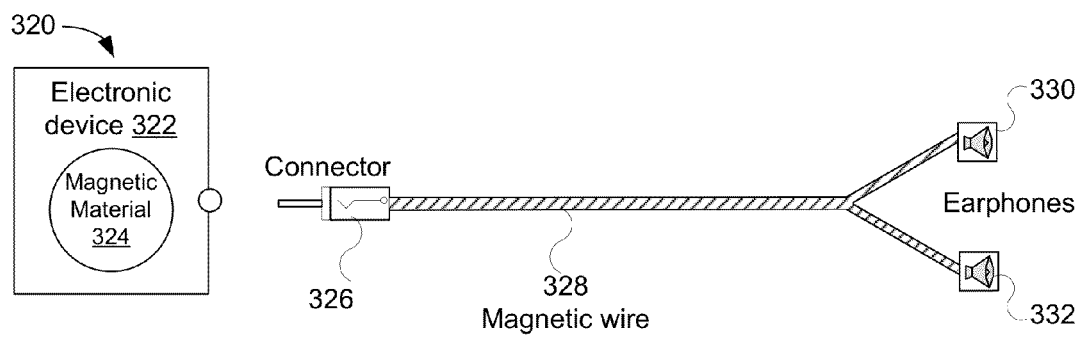
Figure 3C:
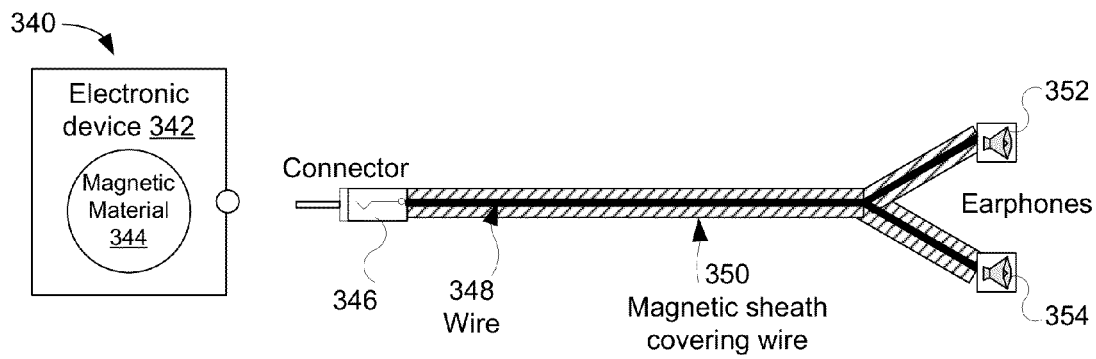
Figure 3D:
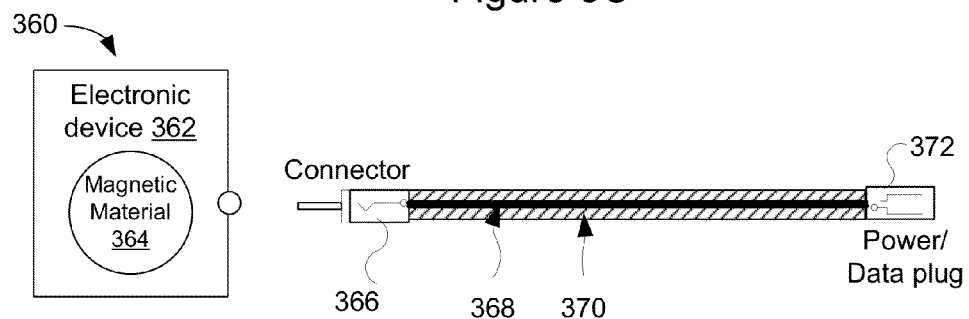

A sheath (e.g., sheath 350, FIG. 3C) is formed (814) and coupled to at least a portion of the electronic cord, wherein the sheath is configured to magnetically attach the cord to an object (e.g., magnetic material 344 on electronic device 342, FIG. 3C).

A first connector (e.g., connector 346, FIG. 3C) is formed (816) and electronically coupled to the first end of the electronic cord. The first connector is configured to electronically couple the cord to the object, wherein the second end of the cord is configured to be electronically coupled to an electronic device.

Advantages of the improved magnetic cord management system include that it is easy to use. In some embodiments, the user does not even have to look at the cord while manipulating it. The user simply grasps and bunches up the cord (causing sheaths and magnets on the cord to magnetically attach, thus holding the cord in the bunched position) and places the cord against the electronic device, where the cord will magnetically attach to a magnet or magnetic material on the device. No alignment is required between sheaths or magnets. No specific orientation of sheaths to magnets is required for the sheaths and magnets to stick. This makes the system convenient to use. There is no male-female matching required, as is the case in some conventional cord management systems.

A plurality of sheaths may be magnetically coupled to a magnet. A plurality of magnets may be magnetically coupled to a sheath. There is not a one to one match-up or orientation required between magnets and sheaths. Further, in some embodiments of the system, magnets may attach to magnets, and the magnets will orient themselves (via magnetic force) such that opposite poles face each other and they attract. A plurality of magnets may be magnetically attached to each other, or to a sheath. A plurality of sheaths may be magnetically attached to a magnet. In some embodiments, a long sheath (e.g., a sheath having a length of at least half the length of the wire) may be considered to be a plurality of short sheaths. In some embodiments, if a long sheath is coupled to a magnet, e.g., at multiple points on the long sheath, this long sheath may be considered equivalent to a plurality of smaller sheaths coupled to the magnet.

In some embodiments the magnets and sheaths may be constructed with a substantially symmetric shape (e.g., as illustrated in FIGS. 5A-5E and FIGS. 3A-3D) around this sheath e.g., square, oval, triangular, multi-faceted, spheres, polygons, etc. In some embodiments, the symmetric shape may be offset from the center of the wire. This symmetric shape is advantageous in that it makes is easier to place magnets and sheaths around the wire and that do not cause the wire to hang or handle substantially differently to a wire without any attached magnets or sheaths. In contrast, a wire with a substantially asymmetrical attachment may handle awkwardly, cause the wire to tangle, and present a poor user experience.

In some embodiments, the magnets and sheaths present a smooth outer surface free from hooks, points, or other shapes that could catch in clothes, hair, catch on the wire, etc. In these embodiments, it is advantageous to have an outer surface of the magnets and/or sheaths that "hook-free" so that it is less likely to inadvertently catch on items or on the wire itself. In some embodiments, hooks or catches may be present where they serve a purpose.

In some embodiments, the one or more sheaths and the one or more magnets substantially enclose a cross-section of the cord (e.g., as illustrated in FIGS. 5A-5E). By enclosing the cord, there are no ledges, hooks, ridges, or openings between the cord and the inside of the sheath or magnet that could cause the cord to become loose or separate from the magnet or sheath. In addition, there is no gap in which another portion of the cord or another magnet and/or sheath could become caught.

FIGS. 9A-9D illustrate examples of magnetic lanyards and magnetic clips for retaining an electronic device and/or a headset.

Figure 9A:
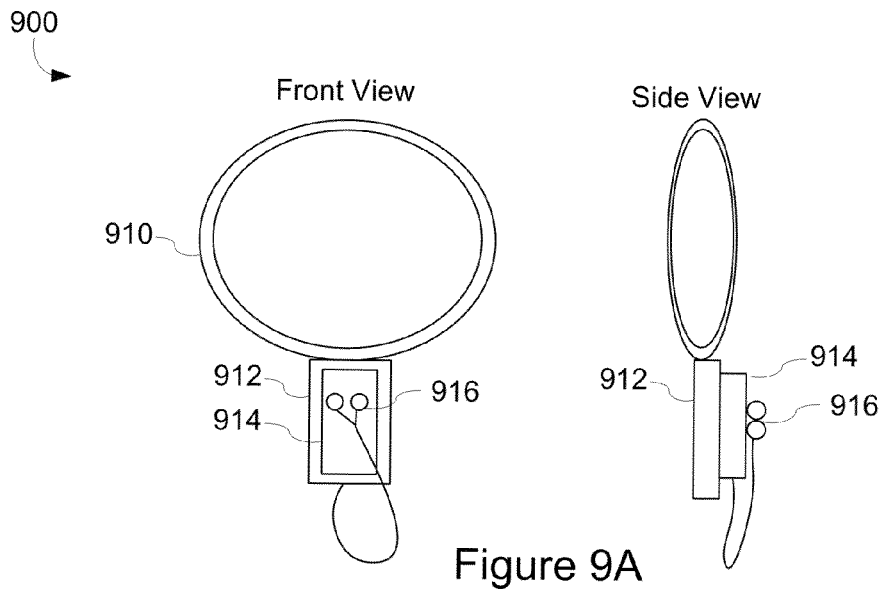
FIGS. 9A-9D illustrate examples of magnetic lanyards and magnetic clips for retaining an electronic device and/or a headset.

In a first embodiment illustrated in FIG. 9A, a lanyard 910, in some embodiments suitable for wearing around the neck, arm, waist, etc., comprises a plate 912. In some embodiments the plate 912 comprises a magnetic material. In some embodiments the plate 912 comprises a magnet. The plate 912 is configured to magnetically couple to an electronic device 914, such as an electronic device having an attached magnet or magnetic material, as described. The electronic device (such as a phone, MP3 player, PDA, etc.) may have attached or include a headset, earphones and/or microphone 916 having magnetic properties, as described.

The lanyard 910 and plate 912 of FIG. 9A allow a user to place and secure an electronic device 912 on the plate. In some embodiments, this can be performed in a one-handed operation, without having to watch and align them. This is advantageous over solutions where a user has to manually align and connect a male and female plug together. If a user has one hand full (e.g., with a coffee cup) and wants to place an electronic device such as a phone or music player on the lanyard/plate, the user holds (with his/her free hand) the electronic device up to the lanyard/plate and it magnetically attaches. In addition, the user can bunch up the headset 916 and magnetically coupled it to the phone/lanyard, as described.

Thus, lanyard and plate 912 provide a convenient solution for a user looking to secure his electronic device and headset, while keeping them easily accessible and within audio and visual range. This makes it more likely that the user will not miss calls, as the user will not have to search in a pocket, purse or bag for the phone if it rings and waste valuable time doing so.

In some embodiments, the plate is smaller than the electronic device. In some embodiments, the plate is shaped to align with the electronic device and provide a snug fit.

Figure 9B:
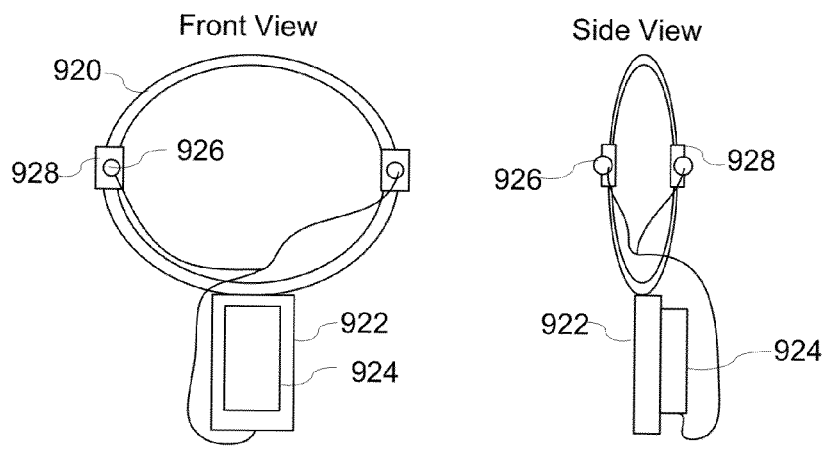

FIG. 9B illustrates an alternate embodiment of a lanyard having a plate 922 for attaching the electronic device 924, as described, and further having mounts 928 for magnetically attaching a headset, earbuds, earphones, or a microphone, as described. This provides a convenient solution for a user who wishes to take out an earbud (e.g., to hear someone speak) and keep it close to the ear (by magnetically coupling it to the mount 928) so it can be put back in again easily. This avoids the earbud from dangling and potentially getting tangled with itself or with something else.

Figure 9C:
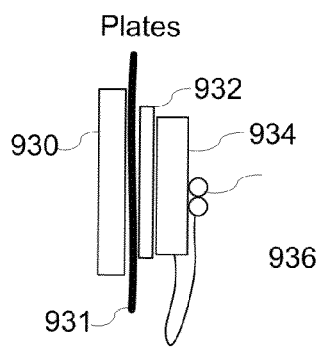

FIG. 9C illustrates an embodiment of a plate 932 for magnetically coupling an electronic device (having a magnet or magnetic material, as described) to be worn next to an item of clothing. For example, a user may want to store an electronic device on the outside of a coat (e.g., in winter) or on the outside of a trouser pocket, etc. The retainer 930 (which may comprise a magnetic material and/or a magnet) is configured to be placed inside an item 931 of clothing, a bag, a purse, etc. The plate 932 is placed on the outside of the item 931, and magnetically couples to the retainer 930. In some embodiments, the plate 932 comprises a magnet or magnetic material that couples to the retainer 930. Thus, the combination of plate and regainer clamp or press against the item 931, and stay in place. A user can then magnetically attach an electronic device 934 (as described) and/or headphones 936, as described. The retainer 930 and plate 932 may be chosen such that they have sufficient magnetic attraction to stay coupled together, even when a user pulls the electronic device 934 away from the plate and retainer. This provides a convenient and easy to use system for magnetically coupling an electronic device to an item of clothing, a bag, a purse, or to other materials. A further advantage of this system is that it does not make holes in or otherwise damage the item 931.

Figure 9D:
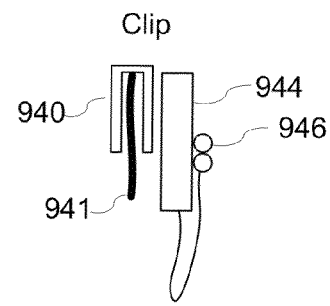

FIG. 9D illustrates an embodiment of a clip 940 for magnetically coupling an electronic device, to be worn next to an item 941 of clothing, a bag or a purse. The clip 940 comprises a magnetic material and/or a magnet. The clip 940 is configured to slide over an item 941 such as a belt, a pocket, a bag, a purse, etc. In some embodiments the clip 940 may have a mechanical spring action to press against the item 941 and stay in position. A user places an electronic device 944 (having a magnet or magnetic material, as described) to the clip and magnetic attraction causes the device and clip to be magnetically coupled together, and to stay in position. A user can also magnetically couple a headset, microphone, earbuds etc. 946 (having a magnet or magnetic material, as described) to the device 944 and/or clip 940. This provides a convenient storage solution for electronic devices and cords.

While the embodiments of FIGS. 9A-9D illustrate the headset as separate from the lanyard, in other embodiments the headset may be incorporated as part of the lanyard, and the plate 912 may be configured to electrically couple the electronic device to the headset, through the lanyard. In such an embodiments, the user would wear the lanyard (having build-in headset and/or microphone and earbuds), and magnetically attach a device (e.g., phone) to the plate, such than an electrical connection is formed between the phone and the earbuds/microphone. The magnetic plate would both secure the phone to the lanyard so it does not fall off, and also provide the electrical link between the phone and headset. In some embodiments, the plate comprises a plurality of wires, tracks, or other electrical signal pathways to achieve this purpose.

Figure 10A:
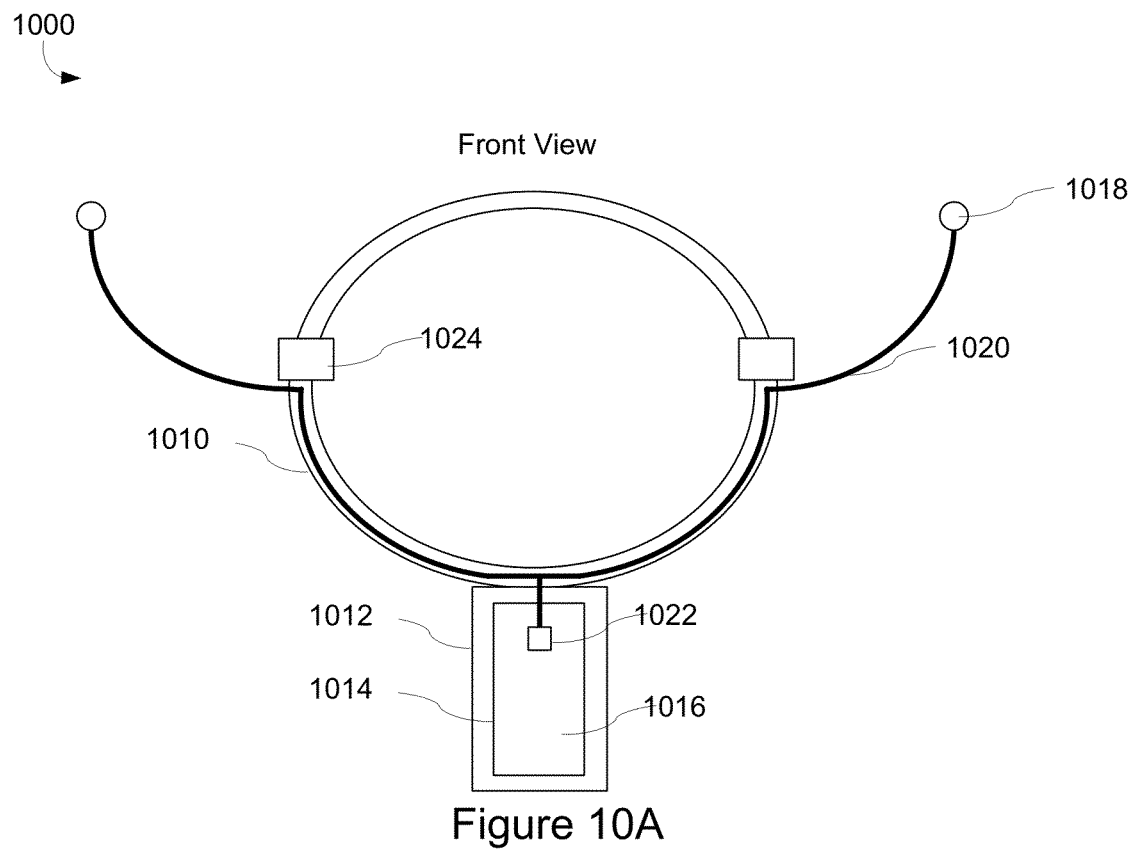
FIGS. 10A-10B illustrate examples of a magnetic lanyard comprising a headset with earbuds, with a magnetic plate for retaining and connecting to an electronic device.
Figure 10B:
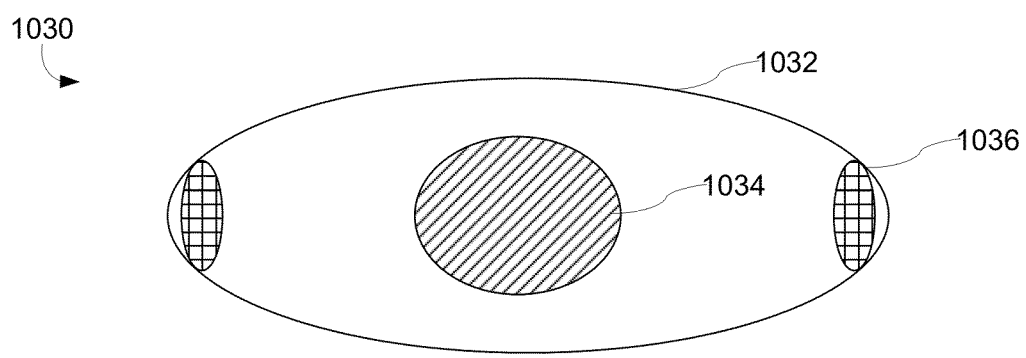

FIGS. 10A-10B illustrate examples of a magnetic lanyard comprising a headset with earbuds, with a magnetic plate for retaining and connecting to an electronic device.

FIG. 10A illustrates 1000 a lanyard 1010. The lanyard comprises a plate 1012, having a magnetic material and/or magnet. The plate further comprises a connector 1022 configured to electrically connect a device 1016 through one or more conductors 1020 in or on the lanyard to earbuds and/or microphone 1018. The device 1016 is magnetically coupled (by a user, in some embodiments in a single-handed operation) to the plate 1012, thus holding the device in position relative to the connector 1022. In some embodiments, this prevents the device from falling from the plate during use, e.g., when exercising, jogging, running, etc. In some embodiments, the surface area of the plate is comparable to the surface area on the back of the device, thus providing a strong magnetic bond and holding the device in place.

This magnetic solution provides advantages over solutions that use a mechanical connector to connect the device to a lanyard and support the full weight of the device through the mechanical connector. Such a mechanical connector requires two hands to mate to the device and can become loose and drop the device (potentially damaging it) during exercise, movement, etc.

In some embodiments, the lanyard 1010 comprises magnetic mounts 1024 (as described) for storing the earbuds 1018 when not in use. In some embodiments, the earbuds 1018 retract into the lanyard 1010 when not in use.

FIG. 10B illustrates a band 1032 (such as an armband) having a magnet or magnetic material 1034. The armband is configured to be worn on the body (e.g., stuck to or worn around an arm) and the material or magnet 1034 is configured to have an electronic device magnetically coupled to it. This allows a user to wear the armband while at the gym, etc. and to attach the electronic device to it during exercise. This is a convenient solution for the use to store and use the electronic device.

In some embodiments, the band 1032 has adhesive, Velcro, magnetic, or other tags 1036 that secure the band around a user's arm or elsewhere. In some embodiments, the band 1032 has an adhesive later suitable for sticking to the skin (like a band aid) and for peeling off again later. In some embodiments, the band 1032 is designed to be disposable.

In some embodiments, the magnets and/or magnetic material described herein have a skin or outer covering, e.g., an outer covering made from silicone, rubber, plastic, cloth, leather, foil, metal, or other material. In some embodiments, the magnets and/or magnetic material described herein are configured to be placed inside a skin, pouch, sleeve, or other covering prior to use.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. An apparatus, comprising:
an electronic cord, the cord having an un-branched segment and a branched segment with at least two branches;
a magnetic material sheath extending substantially the entire length of at least the un-branched segment of the cord and coupled to the cord;
one or more first magnets distinct from the sheath and coupled to the un-branched segment; and
one or more second magnets distinct from the sheath and distributed along at least one of the branches of the branched segment;
wherein the one or more first magnets, the one or more second magnets, and the sheath are configured to couple to one another.

2. The apparatus of claim 1, wherein the one or more second magnets are each configured to magnetically couple to a corresponding one of the one or more second magnets on another of the at least two branches.

3. The apparatus of claim 1, the branched segment comprising two branches, each branch comprising an earphone coupled thereto, wherein the one or more second magnets are remote from the earphones.

4. The apparatus of claim 3, wherein each respective branch comprises a single second magnet located at a midpoint between an end of the respective branch and a joint between the respective branch and the un-branched segment.

5. The apparatus of claim 1, wherein:
the magnetic sheath extends substantially the entire length of the cord;
a first branch of the at least two branches includes the one or more second magnets;
a second branch of the at least two branches includes no second magnets; and
the one or more second magnets are configured to magnetically couple the first branch to the second branch.

6. The apparatus of claim 1, wherein the sheath is seamless.

7. The apparatus of claim 1, wherein the sheath is symmetric around the cord.

8. The apparatus of claim 1, wherein the sheath substantially encloses a cross-section of the cord.

9. The apparatus of claim 1, wherein the sheath presents a non-hooking surface around the cord.

10. The apparatus of claim 1, wherein the magnetic material of the sheath is magnetized and is configured to attach to an unmagnetized portion of an object.

11. The apparatus of claim 10, wherein the object comprises one selected from the group consisting of: a communications device, an audio device, a multimedia device, an entertainment device, and a personal computing device.

12. The apparatus of claim 1, wherein the magnetic material of the sheath is unmagnetized and is configured to attach to a magnetized portion of an object.

13. The apparatus of claim 12, wherein the object comprises one selected from the group consisting of: a communications device, an audio device, a multimedia device, an entertainment device, and a personal computing device.

14. The apparatus of claim 1, wherein the magnetic material of the sheath is configured to attach the cord to itself.

15. The apparatus of claim 1, wherein the sheath comprises a pliable material.

16. The apparatus of claim 1, wherein the sheath comprises a mesh material.

17. The apparatus of claim 1, wherein the sheath comprises a paint that includes a magnetic material.

18. The apparatus of claim 1, wherein the magnetic material is a ferrous material.

19. The apparatus of claim 1, wherein the one or more first magnets are configured to couple to the sheath at any location along the length of the sheath.

\* \* \* \* \*